(12) United States Patent
Rahman et al.

(10) Patent No.: US 9,093,810 B2
(45) Date of Patent: *Jul. 28, 2015

(54) DENDRIMER BASED TERAHERTZ GENERATOR

(75) Inventors: Anis Rahman, Harrisburg, PA (US); Aunik K. Rahman, Harrisburg, PA (US)

(73) Assignee: Applied Research and Photonics, Inc., Harrisburg, PA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/281,230

(22) Filed: Oct. 25, 2011

(65) Prior Publication Data

US 2012/0099827 A1   Apr. 26, 2012

Related U.S. Application Data

(62) Division of application No. 11/862,474, filed on Sep. 27, 2007, now Pat. No. 8,050,531.

(60) Provisional application No. 60/827,206, filed on Sep. 27, 2006.

(51) Int. Cl.
| | |
|---|---|
| *G02B 6/00* | (2006.01) |
| *H01S 1/02* | (2006.01) |
| *B82Y 20/00* | (2011.01) |
| *G02F 1/35* | (2006.01) |
| *G02F 1/355* | (2006.01) |

(Continued)

(52) U.S. Cl.
CPC . *H01S 1/02* (2013.01); *B82Y 20/00* (2013.01); *G02F 1/353* (2013.01); *G02F 1/3558* (2013.01); *G02F 1/3611* (2013.01); *G02F 1/3612* (2013.01); *G02F 1/361* (2013.01); *G02F 1/365* (2013.01); *G02F 2203/13* (2013.01)

(58) Field of Classification Search
None
See application file for complete search history.

(56) References Cited

U.S. PATENT DOCUMENTS

| | | |
|---|---|---|
| 7,389,029 B2 | 6/2008 | Rahman et al. |
| 7,391,032 B1 | 6/2008 | Hyde et al. |
| 7,480,434 B2 | 1/2009 | Hochberg et al. |

(Continued)

FOREIGN PATENT DOCUMENTS

| | | |
|---|---|---|
| JP | 09-274117 | 10/1997 |

OTHER PUBLICATIONS

Tomalia, Donald A., "Birth of a New Macromolecular Architecture: Dendrimers as Quantized Building Blocks for Nanoscale Synthetic Organic Chemistry," Aldrichmica Acta, vol. 37, No. 2, (2004), pp. 39-57.

(Continued)

*Primary Examiner* — Sarah Hahm
(74) *Attorney, Agent, or Firm* — Volpe and Koenig, P.C.

(57) ABSTRACT

A high efficiency electro-optic dendrimer based technology for nanophotonic integrated circuit devices is presented. In particular, a high power terahertz (THz) source is implemented using an electro-optic dendrimer via electro-optic rectification. Electro-optic rectification provides inherent power scalability, because, pump-THz conversion is not limited either by emission saturation or by heat dissipation. Low dielectric loss and high electro-optic coefficient of dendrimer along with a waveguide structure provides higher output power and tunable THz power generation. A dendrimer fiber array is also disclosed by means of which the input/output signals are connected to multiple components and devices.

18 Claims, 16 Drawing Sheets

(51) Int. Cl.
*G02F 1/361* (2006.01)
*G02F 1/365* (2006.01)

(56) References Cited

U.S. PATENT DOCUMENTS

| | | | |
|---|---|---|---|
| 7,919,755 B2* | 4/2011 | Rahman et al. | 250/341.1 |
| 8,050,531 B2 | 11/2011 | Rahman et al. | |
| 8,759,778 B2* | 6/2014 | Rahman | 250/341.1 |
| 2004/0022475 A1 | 2/2004 | Pennington | |
| 2005/0002628 A1 | 1/2005 | Rahman et al. | |
| 2008/0128618 A1 | 6/2008 | Rahman et al. | |

OTHER PUBLICATIONS

Ahn, J., et al., "Terahertz waveform synthesis via optical rectification of shaped ultrafast laser pulses," Optics Express, vol. 11, No. 20, (Oct. 6, 2003), pp. 2486-2496.
Rahman, Anis, "Nanophotonic Integrated Circuit: A Platform for "Optical Processor"," web page, Applied Research and Photonics, Inc., pp. 1-18.
Website: http://prola.aps.org/abstract/PRL/v28/i14/p897_1, "Optical Rectification by Impurities in Polar Crystals," Physical Review Online Archive, Issue 14, (Apr. 1972), pp. 1-2.
Blum, Robert et al., "High-electric-field poling of nonlinear optical polymers," J. Optical Society of America B, vol. 15, No. 1, (Jan. 1998), pp. 318-328.
Boyd, Robert W., "The Nonlinear Optical Susceptibility," Nonlinear Optics Second Edition, Copyright 2003.
Cao, Hua, et al.,"Broadband generation of terahertz radiation in a waveguide," Optics Letters, vol. 29, No. 15, (Aug. 1, 2004), pp. 1751-1753.
Carr, G.L., et al., "High-power terahertz radiation form relativistic electrons," Nature, vol. 420, (Nov. 14, 2002), pp. 153-156.
Chang, Guoqing, et al., "Power Scalable compact THz system based on an ultrafast Yb-doped fiber amplifier," Optics Express, vol. 14, No. 17, (Aug. 21, 2006), pp. 7909-7913.
Chen, Q., et al., "Electro-optic transceivers for terahertz-wave applications," J. Optical Society of America B., vol. 18, No. 6 (Jun. 2001), pp. 823-831.
Rahman, Anis, "Electro-optic properties of dendrimer," J. Optical Society of America, (2007), 7 pages.
Gadret, G., et al., "Nonlinear Optical Properties of Poled Polymers," SPIE, Nonlinear Optical Properties of Organic Materials IV, vol. 1560 (1991), pp. 226-237.
Gordon, Daniel F., et al., "Tunable, high peak power terahertz radiation from optical rectification of a short modulated laser pulse," Optics Express, vol. 14, No. 15, (Jul. 24, 2006), pp. 6813-6822.
Hayden, Michael I., et al., New Materials for Optical Rectification and Electrooptic Sampling of Ultrashort Pulses in the Terahertz Regime, Journal of Polymer Science: Part B: Polymer Physics, vol. 41, (2003), pp. 2492-2500.
Herman, W.N. and Cline, J.A., "Chielectric relaxation: chromophore dynamics in an azo-dye-doped polymer," J. Optical Society of America B, vol. 15, No. 1, (Jan. 1998), pp. 351-358.
Website: http://spiedl.aip.org/getabs/servlet/GetabsServlet, Jen, Alex, K.Y., et al., "Highly efficient and thermally stable organic/polymeric electro-optic materials by dendritic approach," SPIE—The International Society for Optical Engineering, (2003 Copyright), 2 pages.

Michelotti, F., et al., "Study of the orientational relaxation dynamics in a nonlinear optical copolymer by means of a pole and probe technique," J. Appl. Physics, American Institute of Physics, vol. 80, No. 3, (Aug. 1, 1996), pp. 1773-1778.
Mortazavi, M.A., et al., "Second-harmonic generation and absorption studies of polymer-dye films oriented by corona-onset poling at elevated temperatures," J. Optical Society of America B, vol. 6, No. 4, (Apr. 1989), pp. 733-741.
Otomo, Akira, et al., "Remarkable optical properties of dendrimers for laser applications," Linear and Nonlinear Optics of Organic Materials, Proceedings of SPIE, vol. 4461, (2001), pp. 180-187.
Rahman, K.M.A., et al., "Adsorption of Poly(amidoamine) Dendrimers on Gold," American Chemical Society, Langmuir, vol. 16, No. 26, (2000), pp. 10154-10160.
Website: http://www.sciencedirect.com/science, Ramian, Gerald, "Nuclear Instruments and Methods in Physics Research Section A: Accelerators, Spectrometers, Detectors and Associated Equipment: The new UCSB free-electron lasers," ScienceDirect, vol. 318, Issues 1-3 (Jul. 1, 1992), pp. 225-229 (2 pages).
Reid, Matthew and Fedosejevs, Robert, "Quantitative comparison of terahertz emission from (100) InAs surfaces and a GaAs large-aperture photoconductive switch at high fluences," Applied Optics, vol. 44, No. 1 (Jan. 1, 2005), pp. 149-153.
Ricci, Vincent and Stegeman, George, I, "Poling of multilayer polymer films for modal dispersion phase matching of second-harmonic generation: effects of glass-transition temperature matching in different layers," J. Optical Society of America B, vol. 17, No. 8, (Aug. 2000), pp. 1349-1353.
Schildkraut, Jay S., "Limitations to the determination of the optical properties of a thin film by combined ellipsometric and surface plasmon resonance measurements," Applied Optics, vol. 27, No. 16, (Aug. 15, 1988), pp. 3329-3333.
Sinyukov, Alexander M. and Hayden, Michael L., "Generation and detection of terahertz radiation with multilayered electro-optic polymer films," Optics Letters, vol. 27, No. 1 (Jan. 1, 2002), pp. 55-57.
Sinyukov, Alexander M., et al., "Resonance enhanced THz generation in electro-optic polymers near the absorption maximum," Applied Physics Letters, vol. 85, No. 24 (Dec. 13, 2004), pp. 5827-5829.
Stuart, R.A., et al., "Present Status of the Compact EM THz Source," 3rd EMRS DTC Technical Conference, Edinburgh (2006), 6 pages.
Teng, C.C. and Man, H.T., "Simple reflection technique for measuring the electro-optic coefficient of poled polymers," Applied Physics Letters, vol. 56, No. 18 (Apr. 30, 1990), pp. 1734-1736.
Xu, J.Z. and Zhang, X.C., "Optical rectification in an area with a diameter comparable to or smaller than the center wavelength of terahertz radiation," Optics Letters, vol. 27, No. 12, (Jun. 15, 2002), pp. 1067-1069.
Website: http://scitation.aip.org/getabs/servlet/GetabesServlet, Yang, K.H., et al., "Generation of Far-Infrared Radiation by Picosecond Light Pulses in $LiNbO_3$," Applied Physics Letters, vol. 19, Issue 9 (Nov. 1, 1971), pp. 320-323 (2 pages).
Wang, Kanglin and Mittleman, Daniel M., "Metal wires for terahertz wave guiding," Nature, vol. 432, (Nov. 18, 2004), pp. 376-379.
Ma, Hong and Jen, Alex, K.Y., "Functional Dendrimers for Nonlinear Optics," Advanced Materials, vol. 13, No. 15, (Aug. 3, 2001), pp. 1201-1205.

* cited by examiner

DENDRIMER BASED TERAHERTZ GENERATOR

CROSS REFERENCE TO RELATED APPLICATIONS

This application is a divisional of U.S. Ser. No. 11/862,474, filed Sep. 27, 2007, which issue as U.S. Pat. No. 8,050,531 on Nov. 1, 2011, which claims the benefit of U.S. Provisional Application No. 60/827,206, entitled "Electro-Optic Dendrimer, Electro-Optic Sensor, THz Waveguide, and Production Thereof, filed Sep. 27, 2006. This application is related to U.S. Ser. No. 11/862,473, entitled "Dendrimer Based Electro-Optic Sensor", filed on Sep. 27, 2007; U.S. patent application Ser. No. 10/710,303, filed Jul. 1, 2004, which was published as U.S. 2005/0002628 on Jan. 6, 2005; U.S. patent application Ser. No. 11/335,110, filed on Jan. 19, 2006; and U.S. Pat. No. 7,110,627, issued on Sep. 19, 2006, all of which are herein incorporated by reference.

FIELD OF INVENTION

The present invention relates to high electro-optic (EO) efficiency waveguide based nanophotonic integrated circuits (nPIC) via a dendrimeric nanomaterial. In particular, high coefficient electro-optic dendrimer is used to generate terahertz radiation. Further, waveguides are fabricated for photonic waveguide based devices, namely, high power terahertz (THz) generators or sources.

BACKGROUND OF THE INVENTION

In general, electro-optic (EO) devices such as the THz generator exploit material properties such as electro-optic coefficient, susceptibility, and processing parameters for creating smart and high performance devices. The materials used in the current art are primarily inorganic materials such as lithium niobate ($LiNbO_3$), galium phosphide etc. Other inorganics such as ferroelectric relaxors, [e.g., lead magnesium niobate (PMN), lead zirconium niobate (PZN) and mixtures of these ferroelectric relaxors], and electro-ceramics such as lead lanthanum zirconium titanate (PLZT) have also been mentioned. Zinc telluride (ZnTe) is also commonly used for THz sensing. However, the biggest problem with this class of inorganic materials is that they are not compatible for monolithic lithography and integrated device fabrication. Additionally, they require very high temperature processing, beyond the range of the lithography process. Further, commonly used materials have a smaller EO coefficient; e.g, ~33 pm/V for $LiNbO_3$ and ~25 pm/V for ZnTe. Thus, the device performance is limited by material constraints. It has been shown that PMMA with a dye (called Lemke) has over ~0-3 THz window. This material's reported EO coefficient is 25-30 pm/V. Because of its low dielectric constant, it exhibits a better phase matching and generates a higher power (~ mW) compared to its inorganic rival (ZnTe crystal). However, it has the disadvantage that it has a low glass transition temperature, Tg (~85° C.), and photo-degradation of the dye molecules from continuous exposure to 510 nm laser occurs. It has also been reported that a polymer based parallel plate metal waveguide in ~0.5-2 THz window showing that both optical pump beam and generated THz radiation can propagate in the fundamental mode of the waveguide. This allows for a non-critical phase matching over an interaction length of up to 3 mm. They used a 3 μm active core layer composed of 10-mol % disperse red 1-methyl methacrylate (DR1-MMA) copolymer that has a linear chain molecular structure.

The THz region of the spectrum has not been utilized to full potential to harness its power, primarily because of the difficulty in providing a suitable THz source. A limited number of currently available THz sources are usually weak, bulky, expensive, and incoherent. Nonetheless, there are many important reasons why the THz range is of intrinsic scientific interest and it is also rich in potential commercial applications.

THz radiation, also called T-ray, is non-ionizing, penetrates many materials that are opaque to visible and infra-red (IR) light. T-rays also suffer less Rayleigh scattering than infra-red; interact strongly with water, but passes through a few mm of biological tissue and a kilometer of mist. Many material excitations lie in the THz range, e.g. molecular rotations and vibrations, giving rise to a molecular "signature". It is also noteworthy that a number of natural phenomena involve the THz frequency range: for example, the value of thermal energy, KBT, (where KB is the Boltzmann constant) at room temperature (T=300K) corresponds to approximately 6 THz, so that many biological processes may be regarded as THz phenomena. The advent of molecular signature can be exploited to identify biological molecules for potential applications in medical diagnosis and therapeutics.

Till this day the lack of high power, portable, room temperature THz sources is the most significant limitation of THz systems. Some promising new approaches have the potential to bring THz technology a step further to everyday applications. But many of these sources are still not fully developed technologies. An overview of different THz sources is given in the following paragraphs. THz radiation is naturally emitted by all bodies. The blackbody radiation in this spectral range, below the far infrared, is comparatively weak—lower than 1 μW per $cm^3$. Sources like light bulbs in the visible spectrum are therefore unsuitable as a THz source.

Most techniques providing broadband pulsed THz sources are based on the excitation of different materials by means of ultra short laser pulses. These are photo-carrier acceleration in photo conducting antennas, second order non-linear effects, plasma oscillations, and electronic non linear transmission lines. Unfortunately most of the technologies have very low conversion efficiencies, nano to micro watts, compared to about 1 W power from the optical source. In the photoconduction approach a photoconductor (e.g., GaAs, InP) is shined with ultra fast laser pulses, with photon energy greater than the bandgap of the material, to create electron hole pairs. An electric field of about 10 V/cm is generated in the semiconductor by applying a DC voltage. The applied static field causes the free carriers to accelerate and form a short photocurrent. Because of the acceleration, these moving electrons may radiate electromagnetic waves in the THz range. However, the above mentioned photoconductive emitters are not capable of large average power; a maximum of 40 μW power and a bandwidth of ~4 THz may be obtained.

Another approach for THz generation is optical rectification. Here again ultrafast laser pulses are used in combination of the non-linear properties of materials. This means that the pulsed optical beam itself is the origin of THz radiation. These nonlinear effects arise when one illuminates a crystalline lattice with higher intensities. The required photon energy is achieved through a down conversion process. This means that an incoming beam splits into two outgoing beams of lower frequencies: $\omega_{in}=\omega_{o1}\omega_{o2}$, where, $\omega_{in}$ is the angular frequency of the incoming beam and $\omega_{o1}$ and $\omega_{o2}$ are the angular frequencies of the outgoing beams. The output frequency is not unique. Research in this field has focused in the past on materials like GaAs, ZnTe, and organic crystals. This process provides THz radiation only with very low efficiency.

The narrowband sources mechanisms range from upconversion of radio frequency to different kinds of lasers, including gas lasers, free electron lasers, and quantum cascade lasers. One technique to generate a low power continuous wave (CW) THz radiation is through upconversion of lower frequency microwave oscillators. Frequencies up to 2.7 THz have been demonstrated. Another common source is gas lasers. The gases used are mainly methanol and hydrogen cyanide. In this method a $CO_2$ laser pumps a low-pressure gas cavity with one of the above gases, which lases at the gas molecules emission lines. These frequencies are not tunable and require large cavities and high (kilowatts) power supplies with only output power of the magnitude of milliwatts, thus extremely low efficiency.

Another highly awaited source for THz radiation is semiconductor lasers. In the past these lasers had useful applications in industry because of their higher efficiency. Such a compact system for THz radiation is however still missing. This indicates that although silicon is a capable material for electronics, it is not a suitable or capable material for optics and THz generation.

Another approach to build a semiconductor laser in the THz region is based on quantum cascade laser (QCL). A quantum cascade laser consists of periodic layers of two semiconductor materials, which form a series of coupled quantum wells and barriers with a repeating structure. The wells and barriers are usually nanometer thick layers of GaAs between "potential barriers" of Al—GaAs. Quantum confinement within the wells causes the conduction bands to split into a number of distinct sub bands. Light is emitted by transition of electrons from a higher state to a lower state in the well. As the difference between the energy levels is determined by the thickness of the layers, the produced frequency can be chosen by design of the layers.

The quantum cascade lasers operate only at very low temperatures, at liquid nitrogen. The energy spacing between the inter-subbands ($\Delta E \sim 0.004$ eV) is very small compared to room temperature energy, $k_B T \sim 0.025$ eV. Since $k_B T$ is not lower than $\Delta E$, electrons are always exited into higher subband states. In a quantum cascade laser the subbands couple from the lower state to the higher state of the cascaded quantum wells. If the electrons are now all in upper states they cannot jump anymore through the stairs of the well structure and cannot be used for the lasing. Therefore, room temperature operation is not possible.

It is seen from the above review that there is no turnkey THz source available. A principal barrier to effective application of THz technology in many real-world situations is the available THz power from highly compact sources. For many practical applications, such as inspection and screening, detection of hidden weapons on humans, illicit materials, biological imaging, etc., the lack of power necessitates long signal acquisition times, and is insufficient to divide among an array for parallel detection or synthetic aperture imaging. High power is also critical for sub-surface imaging and spectroscopy applications, where the THz beam may suffer considerable attenuation due to absorption and scattering as it propagates through the medium.

BRIEF SUMMARY OF THE INVENTION

The present invention discloses a high efficiency electro-optic dendrimer based technology for nanophotonic integrated circuit devices. In particular, a high power THz source is implemented using an electro-optic dendrimer via electro-optic rectification. Electro-optic rectification provides inherent power scalability, because, pump-THz conversion is not limited either by emission saturation or by heat dissipation. Low dielectric loss and high electro-optic coefficient of dendrimer along with a waveguide structure provides higher output power and tunable THz power generation. In addition, an array of waveguides is used to generate a higher power THz for real-time imaging of a wider area via a charged coupled device (CCD) system.

BRIEF DESCRIPTION OF THE DRAWINGS

FIG. 15A shows a signature of a material response in accordance with the invention.

DETAILED DESCRIPTION

I. Overview

Figure 1:
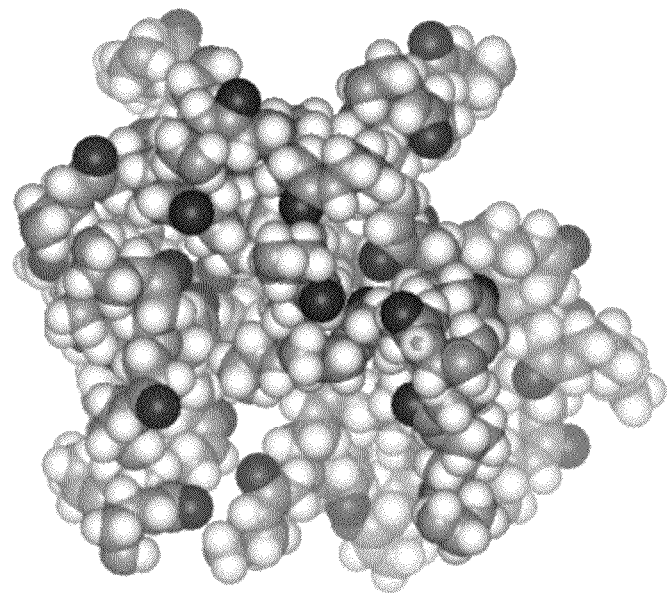
FIG. 1 is a 3-D rendering of a frozen-in time, Generation 3, dendrimer molecule.

Higher Electro-optic (EO) coefficient is a key material parameter to make high sensitivity devices such as high power THz source. A higher EO coefficient and a higher susceptibility of dendrimer can be exploited for THz generation with pulsed and continuous wave (CW) lasers that yields a higher power compared to other sources. Another aspect of the disclosed devices is the fiberoptic connectivity with single-mode fiber. Single mode fiber has THz bandwidth available; however, a THz computing platform is still not available, because, there is no suitable THz generator for computing.

Integrated chip architecture—Above all, dendrimer EO devices can be fabricated on a chip with multiple functionalities, leading to an optical processor that enables high-speed, high bandwidth computing and sensing with a higher reliability.

The aforementioned capabilities are unique and enable many new applications while aiding in significant improvement of current applications. In particular, a high power pulsed and CW THz generator may achieve 30-40 times higher power compared to other sources and may see through mist and obstacles or over a hill. This can be done either with a UAV, MAV or from land based observation station via a dendrimer EO sensor.

In order to achieve the aforementioned enhanced capabilities and devices, one needs to address the following main issues: materials, design, process, and device.

I. A. Materials Used

In general, for electro-optic (EO) devices to have an enhanced performance, a high efficiency material in terms of electro-optic coefficient, e.g., $r_{33}$, $2^{nd}$ order susceptibility, $Y^{(2)}$, and ability to integrate multiple functionalities on a chip, with available manufacturing/fabrication technology, is necessary for creating smart and high performance devices. The inorganic materials used in the current art, as described previously, poses insurmountable difficulties for monolithic fabrication of multifunctional devices. The biggest problem, with these materials are with respect to monolithic fabrication, arises from the fact that they require very high temperature processing, beyond the range of lithography process. Further, commonly used materials such as $LiNbO_3$ and ZnTe have a smaller electro-optic coefficient, thus the device performance is limited by material constraints. Because of these limitations, $LiNbO_3$ and ZnTe are also not good THz generators.

On the other hand EO dendrimer can achieve several times higher EO efficiency compared to $LiNbO_3$ and simultaneously can be fabricated on a chip allowing a highly reliable packaging. Additionally, the monolithic fabrication route allows the waveguide based components to be integrated with other on-chip functionalities, thereby opening a door for a number of important chip based devices. However, an important issue is to dope dendrimer with an appropriate dopant to obtain a multi-functional material suitable for a waveguide core. For instance, doping with $Er^{3+}$ produces optical amplification and doping with a high hyperbolarizability additive (e.g., a chromophore) may enhance its EO efficiency and susceptibility that is necessary for THz generation.

B. Lithography Process/Issues

One of the problems in lithography process is that of obtaining a precise etching geometry of the waveguide. Lithography process for waveguide fabrication involves the following steps as shown in U.S. Patent Application Publication No. 2005/0002628, published on Jan. 6, 2005 by Rahman et al., which is herein incorporated by reference. First a layer of cladding material is deposited on the wafer. This is done by using a spin-on-glass and/or a dendrimer. This is the lower part of the cladding. Second, once the lower cladding is cured, a layer of functional material is deposited on top of the lower cladding layer. This functional layer is a functionalized dendrimer. Third, this second layer is etched to make the core of the waveguide. Fourth, another layer of a cladding material is deposited on top of the core layer. Before etching the core, a photoresist is spun on the core layer on which a selected pattern is imprinted from a mask by UV exposure. The exposed wafer is then rinsed in acetone to wash away the unexposed portions of the resist that generates the device pattern on the wafer.

After this, the wafer is subjected to a reactive ion etching that takes the materials away in a layer by layer fashion from the top of the entire wafer. Consequently, waveguide ridges are generated on the wafer as the resist and dendrimer materials are removed. A key factor here is the etching selectivity of the resist to dendrimer. For instance, common polymer based resists make approximately 1 (one) micron film while the dendrimer (core) layer is from 3 to 5 micron thick. If a given design requires, say a 5 micron ridge depth (in which case dendrimer layer must be 5 micron thick), then a resist to dendrimer selectivity must be of 1:5. The factors that determine the selectivity are primarily the etching agents (gases), their concentration and pressure in the reactor, duration of etching, and the applied rf power of the RIE machine. There is a delicate balance of these variables to achieve a smooth, high quality waveguide that must be determined by design experiments (aka tedious trial and error) method. For instance, while a higher pressure or a higher concentration of particular gas (e.g., chlorine) may attack the dendrimer more vigorously than the resist (thus favoring a higher selectivity for dendrimer), it may result in rough or non-uniform edges that will in turn be detrimental for waveguide performance.

A way to solve this problem is to use a metal based resist (also known as hard mask, e.g., chrome or nickel) in place of a common polymer based resist (soft resist) such as Shipley 1800 series. Because the etching rate of metal based resist (hard resist) is slower than the soft resist, it will produce a deeper etch depth. The main waveguide geometries required for the inventive devices are linear, bent, slab, array, circular, elliptical, and several kinds of taper.

Another way to achieve a deeper etch in a dendrimer film is to use a lift-off process. Here a metal layer is deposited on top of the resist after the resist is exposed to UV but before it is developed. Thereafter, the wafer is rinsed in acetone and all the unexposed photoresist, and overlying metal is washed away, because, only the exposed photoresist hardened during UV mask alignment. Finally, a reactive ion etching (RIE) is performed on the wafer and the dendrimer is etched to the required depth per design. The result from this processing is that, where the UV was exposed, a layer of photoresist is produced, and an overlying layer of metal. The surrounding regions are etched dendrimer. Now the task is to remove the patterned photoresist/metal layer(s), which is called lift-off or wet resist-stripping process. This is done by using a strong acid such as sulfuric acid ($H_2SO_4$) or (or sulfuric acid in combination with an oxidant like chromium oxide ($Cr_2O_3$)), which dissolves the developed resist. If, earlier, the resist was not baked at too high a temperature or too long, even acetone can be used for lift-off. These solvents will remove the photoresist/metal and the end product will be patterned dendrimer on a wafer. Then the wafer is subjected to the reactive ion etching to obtain a predetermined etching depth of the film. The remaining metal is then removed by a wet chemical washing.

I.C. Electro-Optic Poling

A key factor for a higher power THz generation is the electro-optic parameters for a given material. These are the electro-optic coefficient and magnetic susceptibility. These factors depend on the concentration of the dipoles or dipole moments of a non-linear optical (NLO) material and their proper orientation. Dendrimer is a suitable material for this purpose because its electro-optic properties can be enhanced by doping or conjugating dopant molecules.

However, to maximize the above mentioned electro-optic properties, a high field poling is necessary at an elevated temperature, near its glass transition. This process is referred to as corona poling or simply poling. A modified prism coupler setup, as described and shown in FIG. 6 below, can be used for electro-optic measurements. An incident laser is coupled to the waveguide core via a prism (e.g., gadolinium gallium garnet or rutile prism). The transmitted (coupled) laser is measured with a detector to investigate the effects of an external modulating bias and/or temperature and/or other variables such as humidity, gaseous media, etc. A fiber coupled collimator can also be used to monitor any deviation of wavelength as a function of temperature and/or applied bias. Once the film is optimized by poling, it can be used as a THz waveguide source.

I.D. THz Waveguide

Figure 16:
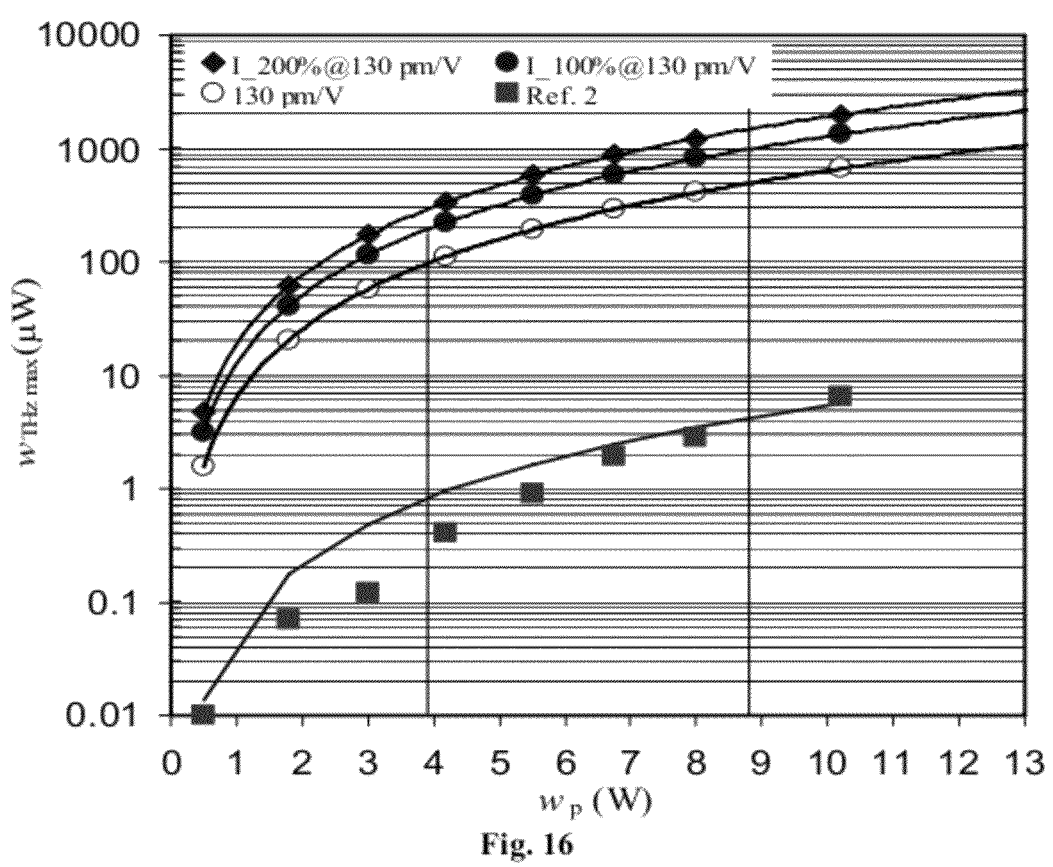
FIG. 16 shows the calculated THz output power for different $r_{33}$ values in accordance with the invention.

A THz waveguide is an integrated source of THz radiation on a chip that utilizes the so-called electro-optic rectification effect in a high electro-optic coefficient polymer. Here, the second order susceptibility and V is/NIR E-field is exploited for THz generation in a waveguide. A schematic example of the waveguide is shown in FIG. 16. Generated THz radiation is then used for imaging objects of interest such as hidden weapons or explosives on humans with a CCD systems. Other processes such as difference-frequency mixing (DFM) and sum frequency mixing (SFM) can also be used for THz generation.

I.E. THz Generation

Electro-optic rectification (EOR) effect and/or difference frequency mixing can be produced in high hyperbolarizability material that does not require a crystalline lattice. In difference frequency mixing, the generated THz is proportional to the difference of two optical frequencies used to excite the polarizations that generates the THz frequency, $f_{THz}$, given by:

$$f_{THz} \propto v_2 - v_1 \quad (1)$$

where, $v_1$ and $v_2$ are the frequencies of the input lasers. The THz frequency, $f_{THz}$, is much smaller than both $v_1$ and $v_2$. Equation (1) indicates that with the right combination of input lasers, a wide range of $f_{THz}$, can be generated. Additionally, using tunable lasers $f_{THz}$ can also be tuned over a suitable range. This ability of tunable THz generation and its application is currently mostly a void field, but opens many new opportunities in imaging, diagnosis, and therapeutics areas. In principle, difference frequency can be generated using laser diodes of two different frequencies.

II. Exemplary Material Selection and Preparation

Electro-optic properties are important for many photonic devices that generally exploit the non linear optical parameters such as electro-optic coefficient (EOC), $r_{33}$, and the second order susceptibility, $\chi^{(2)}$. These devices include THz emitter, optical modulator, and electro-optic sensors, among others. Dendrimers are a class of star burst polymers with nearly spherical, monodispersed molecular architecture. Unlike side chain polymers, dendrimer structure is characterized by three distinct features: (i) a central multifunctional core, (ii) tiers or "generations" of multifunctional repeat units attached around the core, and (iii) terminal or end groups, that are also multifunctional. For instance, for poly(amido amine) (PAMAM) dendrimer, generation 0 (G0) through generation 10 (G10) have been demonstrated where the molecular size varies from ~1.5 nm for G0 to ~13.5 nm for G10. Manipulating the structural features allows a controlled enhancement of optical and electro-optic properties of these end-functionalized macromolecules. For instance, when chemically complexed (doped) with a dopant such as a chromophore, dendrimer's nonlinear optical properties can be enhanced significantly. It is also known that dendrimers form a self-assembled multilayer on substrates whose thickness can be controlled by manipulating the dendrimer generation and solution chemistry. Because of their highly organized structure, dendrimers form high quality films that are suitable for lithographic fabrication of high quality waveguides and waveguide based photonic devices. These properties can be exploited for a number of potential applications including solid state laser, electro-optics, and photonic integrated circuit. Because dendrimer is suitable for liquid phase doping, its EOC can be enhanced significantly above its intrinsic value. Simultaneously dendrimer can be processed at relatively lower temperatures allowing integration with other functionality via lithography process.

Dendrimer can also be complexed with other impurities to obtain properties such as optical amplification. In addition to planar waveguide, dendrimer can also be used to fabricate photonic crystal based waveguides. A 3-D rendering of a frozen-in time, Generation 3, dendrimer molecule is shown in FIG. 1. Discussed now are details of dendrimer film formation, doping, poling and EOC measurements.

Poly(amido amine) (PAMAM) and poly(amidoamine organosilicon) (PAMAMOS) dendrimer (Dendritech, Inc., Midland, Mich.) were used for the present investigation. PAMAMOS dendrimer is essentially a Polyamidoamine (PAMAM) dendrimer with the end groups complexed by (3-acryloxypropyl)-trimethoxysilane (TMOS). For dendrimer doping, a few considerations are important in choosing a suitable chromophore. Commercially available chromophores were reviewed that produce a higher NLO property because this route can produce faster results than developing a new chromophore. Also, unlike many side-chain polymer based guest-host system where a higher chromophore loading is required to achieve appreciable NLO characteristics, dendrimer is expected to require relatively lower doping concentration to achieve higher electro-optic properties. This is because dendrimer itself being a polar molecule favors higher dipole formation via its charge centers. PAMAMOS dendrimer has a functional group with relatively high affinity towards amine ($NH_2$) and hydroxyl (OH) groups. Alizarin (1,2-dihydroxyanthraquinone, $C_{14}H_8O_4$) has a suitable structure for complexing with dendrimer (doping) because its phenolic OH will interact with the PAMAMOS amine. However, the hydrogen bonding complex formation of a chromophore with the PAMAMOS requires an excess of amine to provide the proton transferred species. Therefore, a higher generation of PAMAMOS is expected to allow a better environment for chromophore-dendrimer dipole formation. Alizarin (Alfa Aeser) is a good choice as the dopant because it is a non-linear chromophore with a large linear hyperbolarizability and an absorption maxima ~609 nm. This is important for using dendrimer as a THz emitter. Because an electrooptic THz emitter is pumped by a femto second laser in 800 nm wavelength range, having the absorption maxima significantly below this range helps avoiding problems like photo degradation. As a small molecule, alizarin not only can complex with the surface amine groups, but it can also fit in the interstitial space of a dendrimer molecule, thus should help a uniform doping concentration.

In PAMAM dendrimer the chromophores may be attached to the end groups or may be contained inside the molecular cavity because of the secondary amine groups. Although PAMAMOS provides similar environment, it is more likely to conjugate the alizarin molecules within the molecular cavity because most of its surface amines are already taken by TMOS molecules. Also, for effective loading, it is not essential for the chromophore molecule to complex (chelate) with the chelating sites in PAMAMOS matrix, because, attractive force between the chelating sites and one of the functional groups in the chromophore should suffice for uniform doping. Thus dendrimer provides a suitable environment for selective doping and enhancement of NLO properties.

Figure 3:
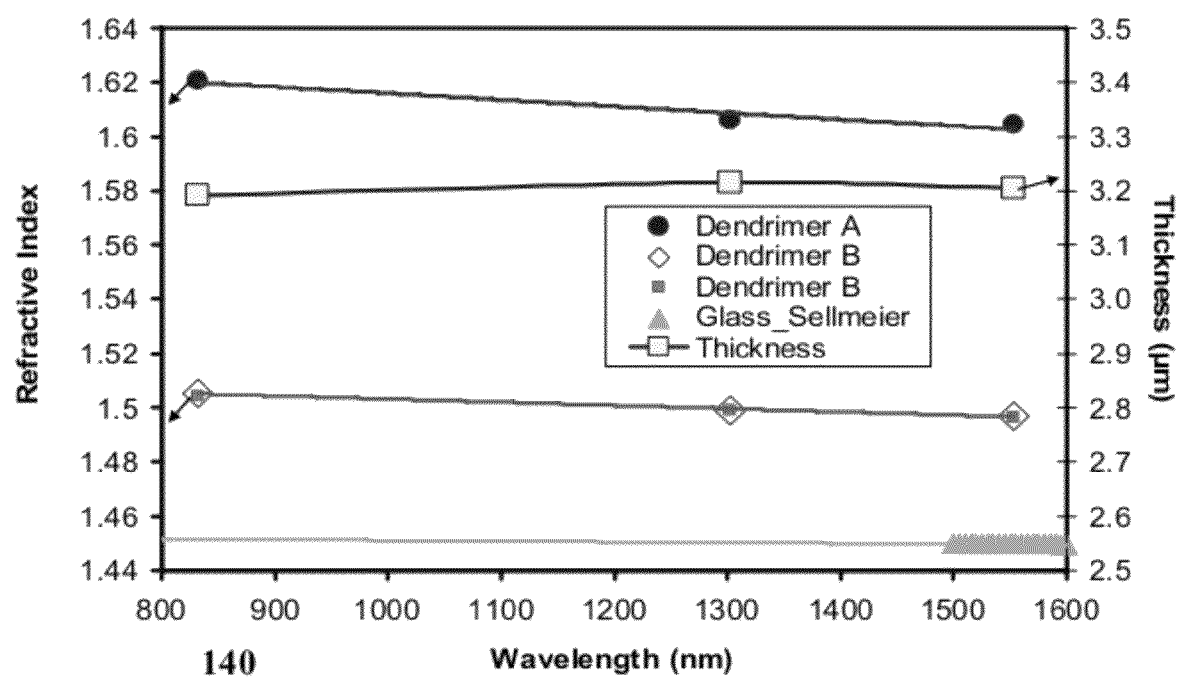
FIG. 3 exhibits measured refractive indices of samples of FIG. 2.
Figure 4:
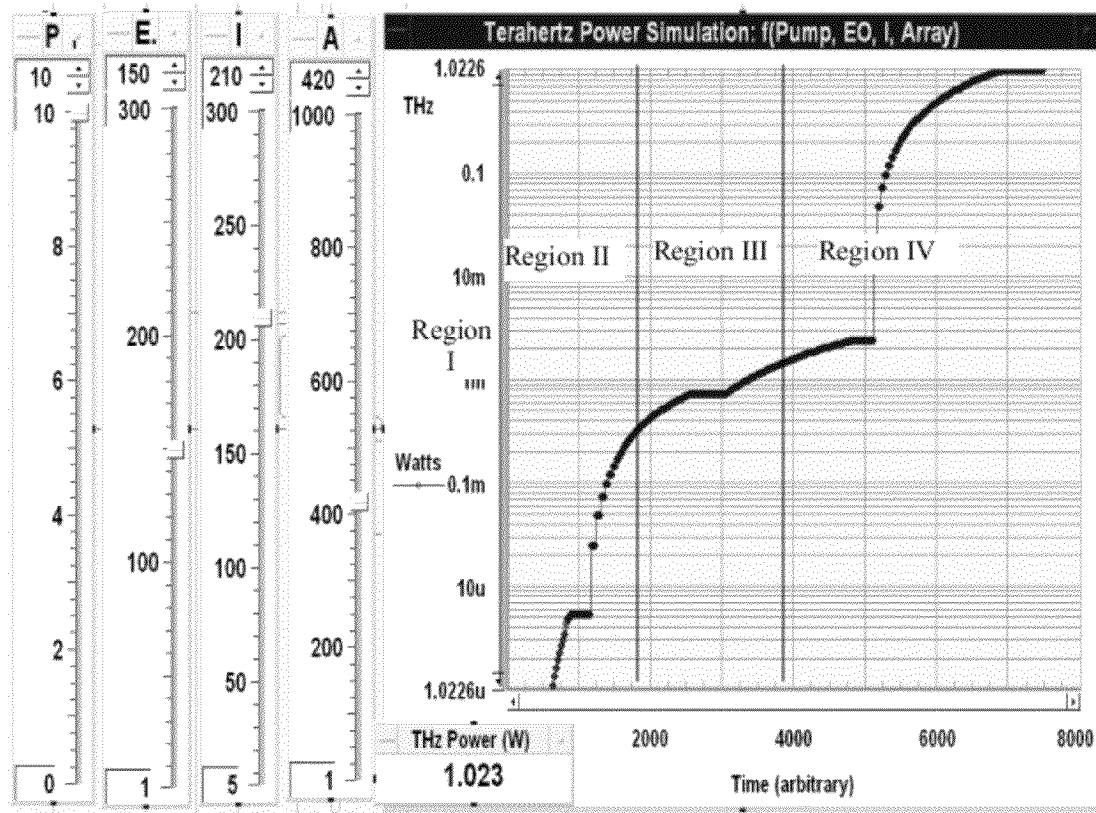
FIG. 4 shows the THz output power in four different regions according to the model in accordance with the invention.

Several dendrimer films' refractive index is shown in FIG. 3. These films were formed either by spin coating or simply by dispensing solution on glass slides and then curing them on a hot plate in ambient atmosphere. The curing process was optimized with a goal of subsequent lithography and etching of these films.

Figure 2:
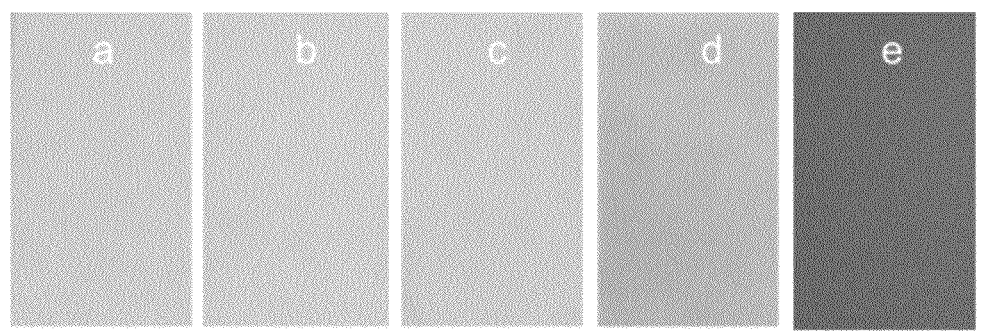
FIG. 2 exhibits dendrimer film of different composition on glass slides with varying refractive index demonstrating the natural index contrast in accordance with the invention.

For refractive index measurements, same solutions were spun on silicon wafers. Both glass slide and wafer were cured simultaneously with identical curing profile. Refractive indexes of the films on wafer were measured with a Metricon 2010. Films 2(a)-(d) are undoped dendrimer where the refractive index has been varied from 1.45 to 1.64 via natural index contrast effect as described in U.S. patent application Ser. No. 10/710,303, filed Jul. 1, 2004, which was published as US 2005/0002628 on Jan. 6, 2005; U.S. patent application Ser. No. 11/335,110, filed on Jan. 19, 2006; and U.S. Pat. No. 7,110,627, issued on Sep. 19, 2006, all of which are herein incorporated by reference, i.e., simply by taking different generation and/or species of dendrimer. For electro-optic measurements, Alizarin doped dendrimer film were prepared by spin coating on silicon wafer or on glass. FIG. 2(e) shows a film formed from dendrimer doped with ~3 wt % alizarin before poling; this film has a refractive index ~1.52. All films were cured at a temperature between 100° C. and 200° C. using a multi step ramp and soak protocol.

Figure 10:
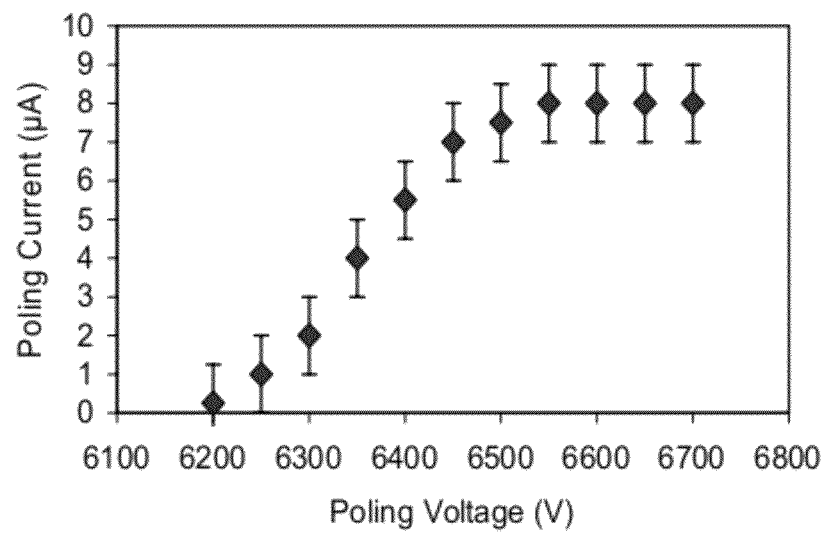
FIG. 10 shows the poling current as a function of applied voltage in accordance with the invention.

Referring now to FIGS. 5-13, the objective of poling is to optimize the dipole alignment of the cured film. Like other polymer films, the value of non-zero $\chi^{(2)}$, and therefore, $r_{33}$, depends entirely on the dipole orientation. To the first approximation, when the aligning field is static, the average orientation depends on the poling field strength, $E_p$. There are a number of poling techniques that have been deployed by other investigators. These are: solid or liquid contact electrode poling, all-optical poling, photo assisted poling and corona poling; all can break the molecular centrosymmetry to produce non-zero nonlinear effect. Here a corona poling was deployed because of the geometrical simplicity of the method and also to avoid complicacies associated with contact electrode poling. For contact poling, electronic conduction within the polymer layer has been identified in many polymers; even a very small conduction current will result in an incomplete (non-efficient) orientation of the dipole moments. It has been previously shown that there are three regions of conduction as a function of applied field for Disperse Red 1 doped PMMA polymer where contact electrodes of ITO and gold were used on either sides of waveguide. Using the inventive film, it has been found that for ~1.44 μm thick active layer cladded between two layers of $SiO_x$ [derived from poly(methyl siloxane)], an Ohmic conduction exists below 25 V/μm. Between 25 and 100 V/μm, conduction via Schottky thermionic emission is dominant while a further higher field may generate larger current via Fowler-Nordheim tunneling. However, the presence of any of these conduction processes will result in a significantly higher current than observed for the present samples as shown in FIG. 10.

Figure 5:
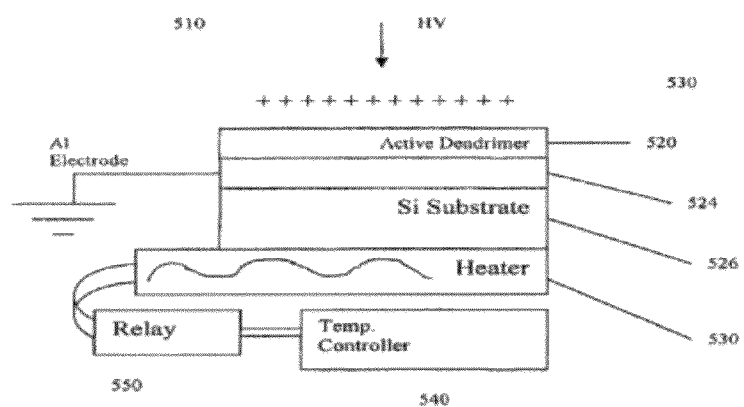
FIG. 5 shows a sample simple poling configuration.

A controlled corona poling was conducted with a needle electrode with the above mentioned side effects in mind. To our knowledge this is the first poling results for the PAMAMOS dendrimer film. The sample configuration 500 is shown in FIG. 5. The high voltage needle electrode 510 was placed 1 cm above a sample surface, namely, dendrimer 520. Dendrimer layer 520 has an electrode layer 524 below it and electrode layer 524 is situated on a silicon or glass wafer 526. Sample temperature was raised at a rate of 4° C./min and held at 110±1° C. by heater 530 in conjunction with a temperature controller 540 and relay 550. In some cases the sample was held at 120° C. or 130° C. or higher. It is expected that as the alignment progresses, poling current will increase as a function of applied field. The poling current should stabilize when maximum alignment is reached. Beyond this point, additional applied field would drive the current higher leading to previously observed phenomena and at a further higher field breakdown of the film may occur.

Figure 11:
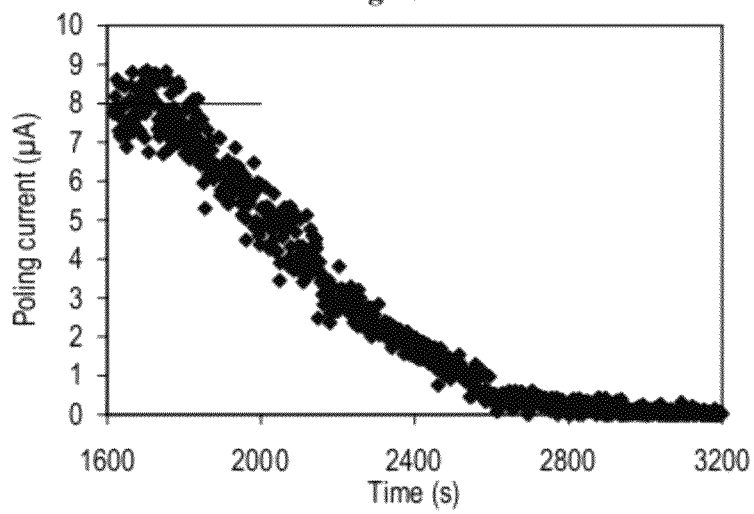
FIG. 11 shows the decay of poling current at applied voltage as the temperature cools off from ~Tg to room temperature in accordance with the invention.

It was observed that the onset of producing a measurable current at 110° C. is >6 kV of applied voltage for the configuration used. Traces of temperature and poling current were monitored during the entire period to examine the poling condition. Voltage was increased at a step of 50 V and the resulting current was recorded. As seen in FIG. 10, the current increased as the voltage was raised above the threshold and stabilized at 8±1 μA at an applied voltage of 6600±100 Volts. Since the film thickness is 100 μm, this corresponds to a field strength of $6.6 \times 10^5$ V/cm. Current remained steady at the maximum applied voltage at a fixed temperature indicating an optimum alignment. Optimum stable poling current (at an applied voltage of 6700 Volts) was maintained for ~30 minutes to allow for the orientation of the dipoles. At that point, while still the high voltage was being applied, the heater 530 was turned off. As expected, the current subsided as the temperature slowly reached to room temperature as shown in FIG. 11. The absence of a higher poling current indicates that this current is not due to the internal conduction within the dendrimer film 520. This procedure thus ensures that a proper poling has been achieved and that the dipoles remain oriented after poling.

Usually a Teng-Man type setup can be used for a direct measurement of the electro-optic coefficient (EOC). In general, a laser beam is reflected off of the poled dendrimer film that is sandwiched between two electrodes via which a low frequency modulation is applied. The modulated beam is detected and monitored by a lock-in amplifier at the modulation frequency.

Figure 8:
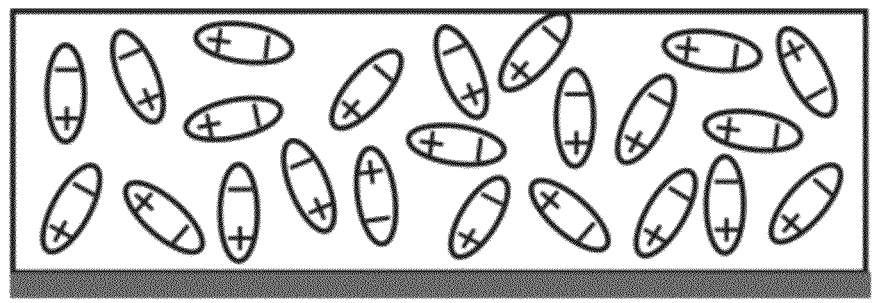
FIG. 8 shows the molecular orientation of unpoled dendrimer in accordance with the invention.
Figure 9:
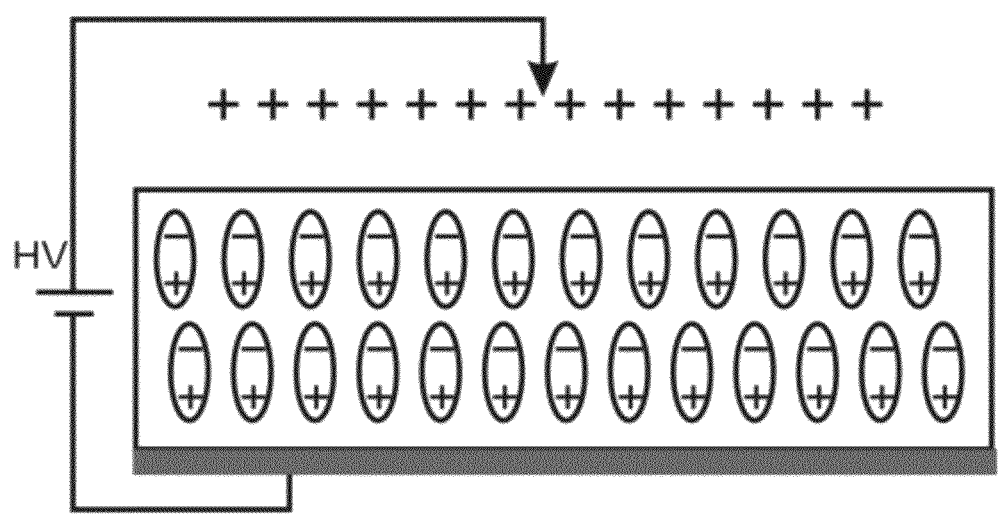
FIG. 9 shows the molecular orientation of poled dendrimer in accordance with the invention.

However, an alternative method can also be used by measuring refractive index change due to poling. Here, the index of dendrimer films is measured before and after poling by a prism coupler (Metricon 2010). The linear Pockels effect is used to deduce the $r_{33}$ parameter from measured refractive index change between unpoled and poled film. As shown in FIG. 8, the orientation distribution of the dipole moments of cured polymer film is isotropic. Hence the index ellipsoid is a sphere. After poling, see FIG. 9, the isotropy is broken and the poled film becomes a uniaxial polar material with a changed refractive index. The index difference, Δn, is related to the EOC via the poling field $E_p$ as, $$|\Delta n| = \tfrac{1}{2} n^3 r_{33} E_p \quad (2)$$

Figure 12:
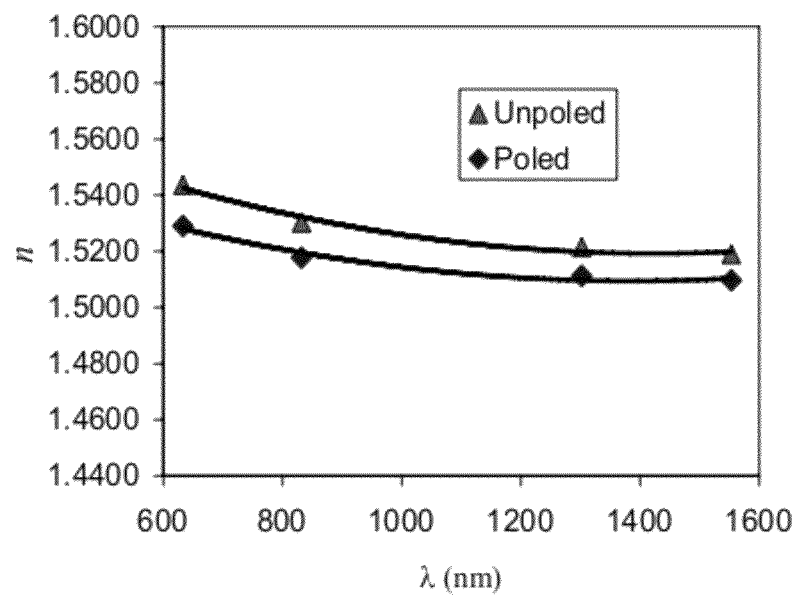
FIG. 12 shows the refractive index variation as a function of wavelength of dendrimer film before and after poling in accordance with the invention.
Figure 13:
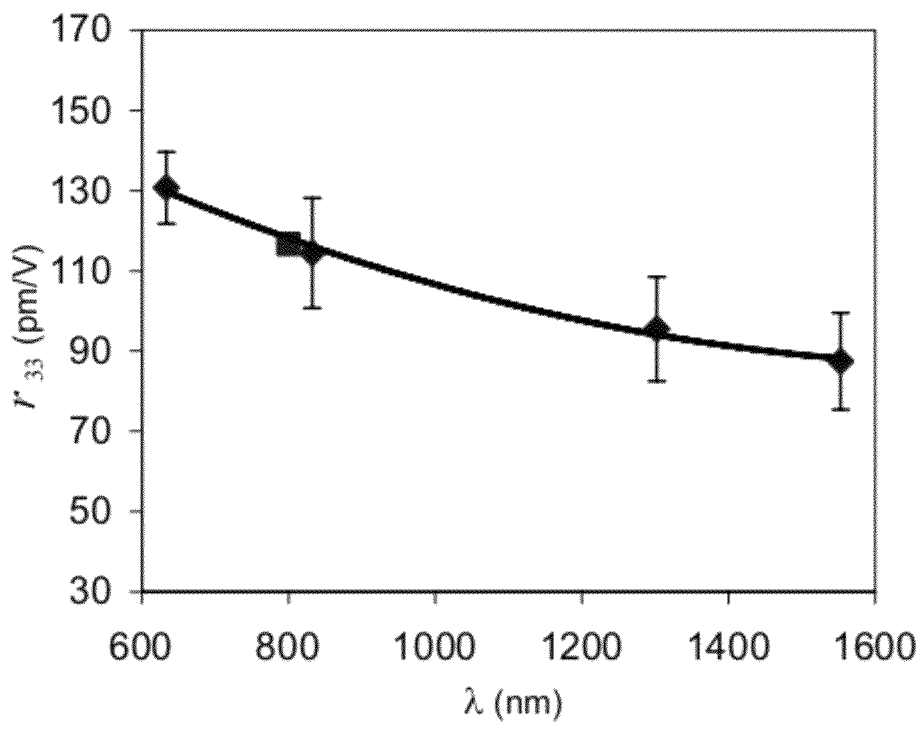
FIG. 13 shows the calculated electro-optic coefficient, $r_{33}$, as a function of wavelength in accordance with the invention.

FIG. 12 shows the measured refractive index (RI) of both poled and unpoled films at room temperature as a function of wavelength. A systematic difference in refractive index has resulted due to poling. This difference is utilized in Eq. (2) to compute $r_{33}$; a value of ~130 pm/V was obtained at 633 nm falling to ~90 pm/V at 1553 nm. See FIG. 13 for graphical representation. While this value is significantly higher than inorganic crystalline materials, e.g., $LiNbO_3$, however, an even higher value, ~300 pm/V is expected via optimizing the doping and poling process.

Figure 6:
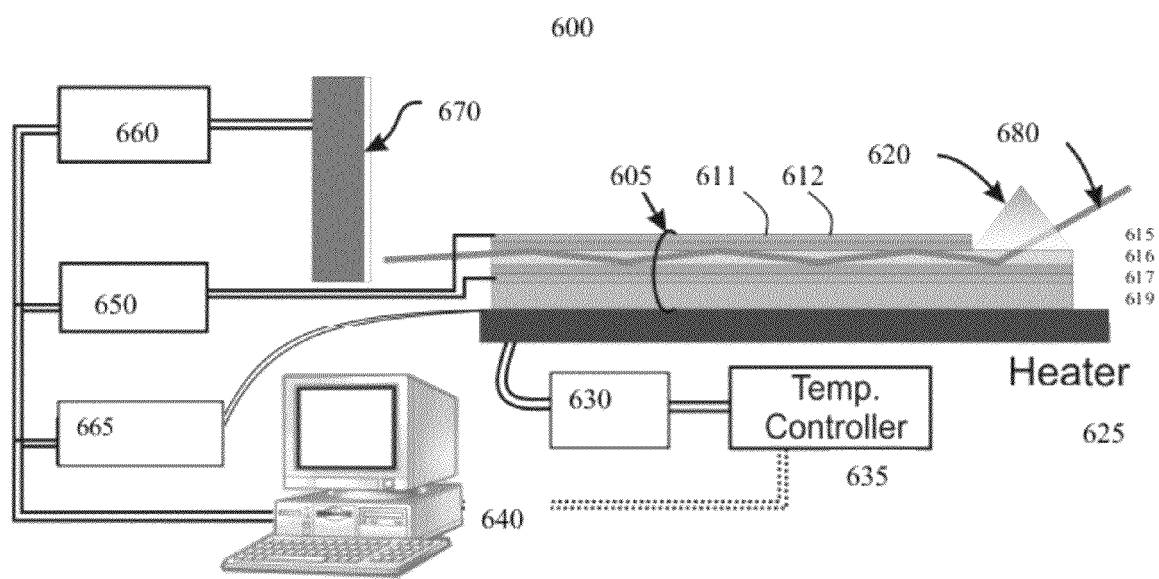
FIG. 6 shows electro-optic poling arrangement of dendrimer film in accordance with the invention.
Figure 7:
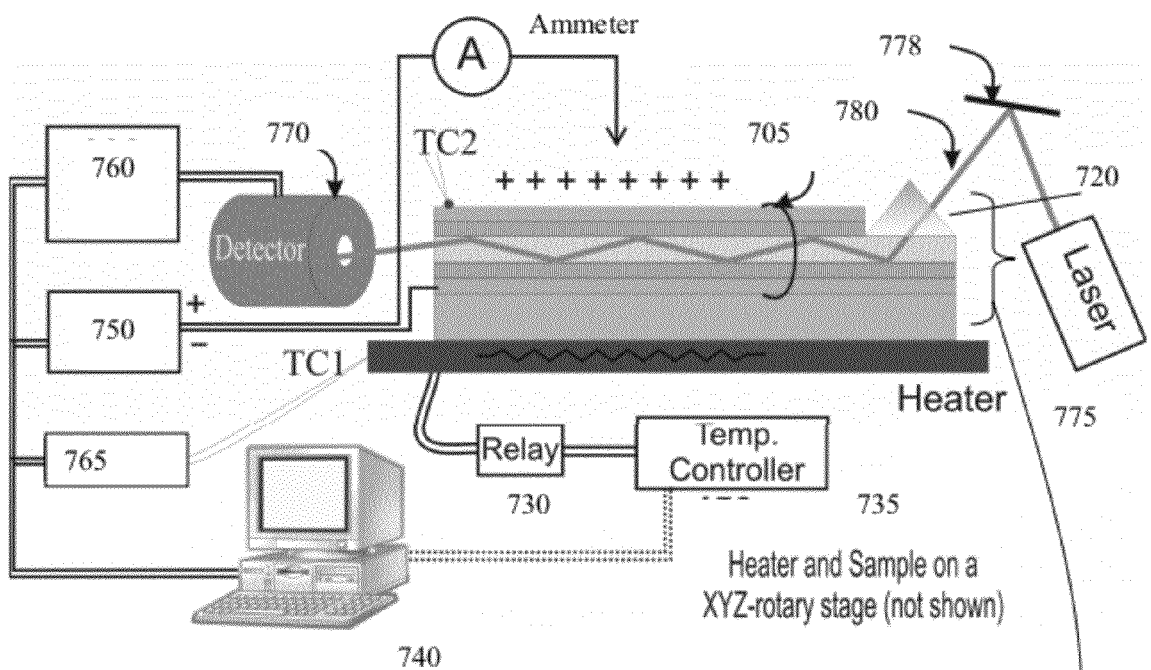
FIG. 7 shows an electro-optic poling measurement arrangement of dendrimer film in accordance with the invention.

Referring now to FIGS. 6 and 7, poling arrangements are shown for in-situ electro-optic poling and laser coupling to the electro-optic dendrimer film on a substrate.

Prior to poling, a dendrimer is doped with a chosen dye or dyes from at least one of the following non-linear organic chromophores:
(2,6-Dimethyl-4H-pyran-4-ylidene)malononitrile;
(S)-(−)-1-(4-Nitrophenyl)-2-pyrrolidinemethanol;
[4-[Bis(2-hydroxyethyl)amino]phenyl]-1,1,2-ethylenetricarbonitrile; 1-Docosyl-4-(4-hydroxystyryl)pyridinium bromide;
2-Dimethylamino)vinyl-1-nitronaphthalene;
2,3,5,6-Tetrafluoro-7,7,8,8-tetracyanoquinodimethane;
2-[[5-(Dibutylamino)-2-thienyl]methylene]-1H-indene-1,3 (2H)-di one;
2-[4-((4-(Bis(2-hydroxyethyl)amino]phenyl)(cyano)methylene]-2,5-c-yclohexadien-1-ylidene]malonitrile;
2-[4-(Dimethylamino)styryl]pyridine;
2-[Ethyl[4-[2-(4-nitrophenyl)ethenyl]phenyl]amino]ethanol;
2-Amino-3-nitropyridine;
2-Amino-5-nitropyridine;
2-Aminofluorene;
2-Chloro-3,5-dinitropyridine;
2-Chloro-4-nitroaniline;
2-Methyl-4-nitroaniline;
2-Nitroaniline;
3-[(4-Nitrophenyl)azo]-9H-carbazole-9-ethanol;
3-Methyl-4-nitropyridine N-oxide;
3-Nitroaniline;
4-(Dibenzylamino)benzaldehyde-N,N-diphenylhydrazone;
4-[4-(Dimethylamino)styryl]-1-docosylpyridinium bromide;
4-[4-(Dimethylamino)styryl]pyridine;
4-Dimethylamino-4¢-nitrostilbene;
4-Nitroaniline;
5-Nitroindole;
5-Nitrouracil;
7,7,8,8-Tetracyanoquinodimethane;
9-Ethyl-3-carbazolecarboxaldehyde-N-methyl-N-phenylhydrazone;
Disperse Orange 25;
Disperse Orange 3;
Disperse Red 1;
Disperse Red 13;
Disperse Red 19;
Disperse yellow 7;
Ethyl 4-(dimethylamino)benzoate;
Gentian Violet, ACS reagent;
Gentian Violet;
N-(2,4-Dinitrophenyl)-L-alanine methyl ester;
N,N-Dimethyl-N-[(5-nitro-2-thienyl)methylene]-1,4-phenylenediamine;
N-[3-Cyano-3-[4-(dicyanomethyl)phenyl]-2-propenylidene]-N-ethyl-ethaniminium inner salt;
Nile Blue A;
Alizarin;
N-Methyl-4-nitroaniline;
trans-4-[4-(Dimethylamino)styryl]-1-methylpyridinium iodide; and
trans-4-[4-Dimethylamino)styryl]-1-methylpyridinium p-toluenesulfonate.

As discussed above, the doped dendrimer film on a substrate is first cured at a suitable temperature, for example, between 50° C. and 400° C. A slightly different temperature may be necessary in some cases depending on the dopant. For instance, addition of an inorganic dopant may need to be cured at a higher temperature. However, some film may even be cured at room temperature over a longer period of time.

Referring back to FIG. 6, a poling arrangement 600 is shown. A THz waveguide structure 605 has a stack comprising an upper electrode layer 611, an upper cladding layer 612, a cured dendrimer film core 615, a lower cladding layer 616, a lower electrode 617, and a substrate 619. A prism coupler 620 is positioned on a section of cured dendrimer film core 615. THz waveguide structure 605 is positioned on a heater 625. Heater 625 is coupled to a relay 630 and temperature controller 635, which in turn is controlled by a computer 640. Computer 640 is also coupled to a power supply 650, a power and wavelength meter 660 and a digital multimeter 665. Power supply 650 is coupled to upper and lower electrodes 611 and 617, respectively. Power and wavelength meter 660 is coupled to a detector 670.

Cured film core 615 is held at a temperature close to its glass transition temperature. The temperature is controlled and monitored by temperature controller 635 with the help of computer 640. Power supply 650 is used to apply an external AC field across the top and bottom electrodes 611 and 617, respectively, which can be varied by computer 640. Prism coupler 620 is used to couple an incident laser beam 680 to core 615. The incident beam's power and its wavelength are monitored by a detector 670 that is connected to power and wavelength meter 660. Here different measurements are carried out in different sequences to measure the electro-optic properties of the film 615 and effects of temperature and applied bias on the film's optical properties.

Figure 14:
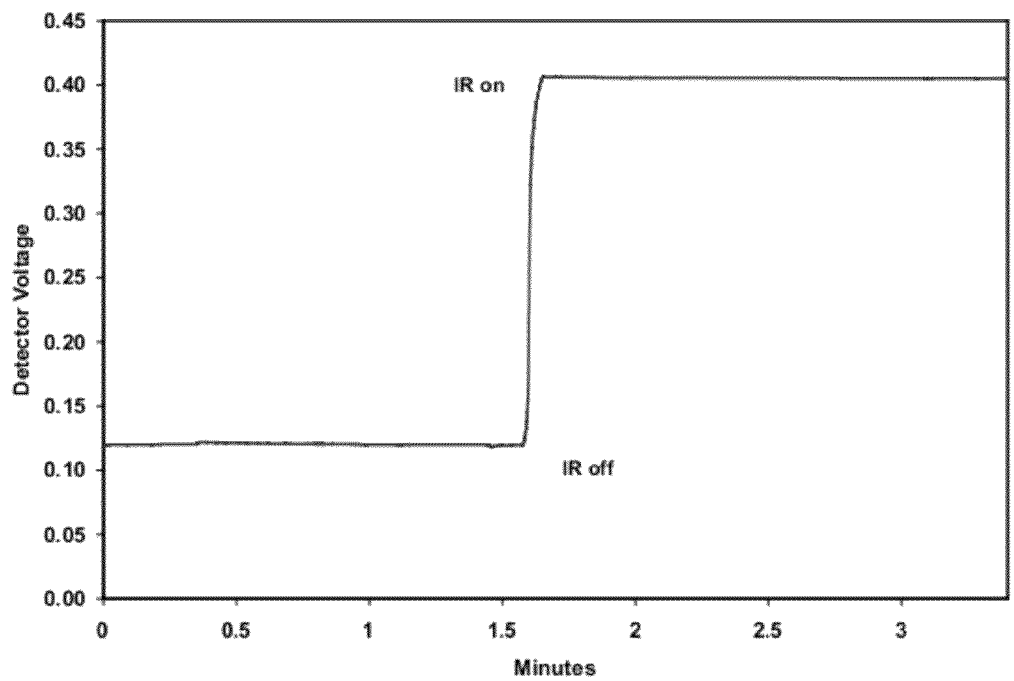
FIG. 14 shows measured data of detector voltage corresponding to IR laser coupling to the film in accordance with the invention.

First, the coupled beam that transmits through the film is recorded by means of detector 670 and is shown in FIG. 14. When the IR laser is off, detector 670 measures about 0.12 volts due to the ambient light. When the IR laser is turned on, the coupled laser light travels through film 615 reaching detector 670, thus raising the measured voltage to ~0.41 volt. A portion of the light also travels through the space before reaching the film as shown in FIG. 6.

Figure 15:
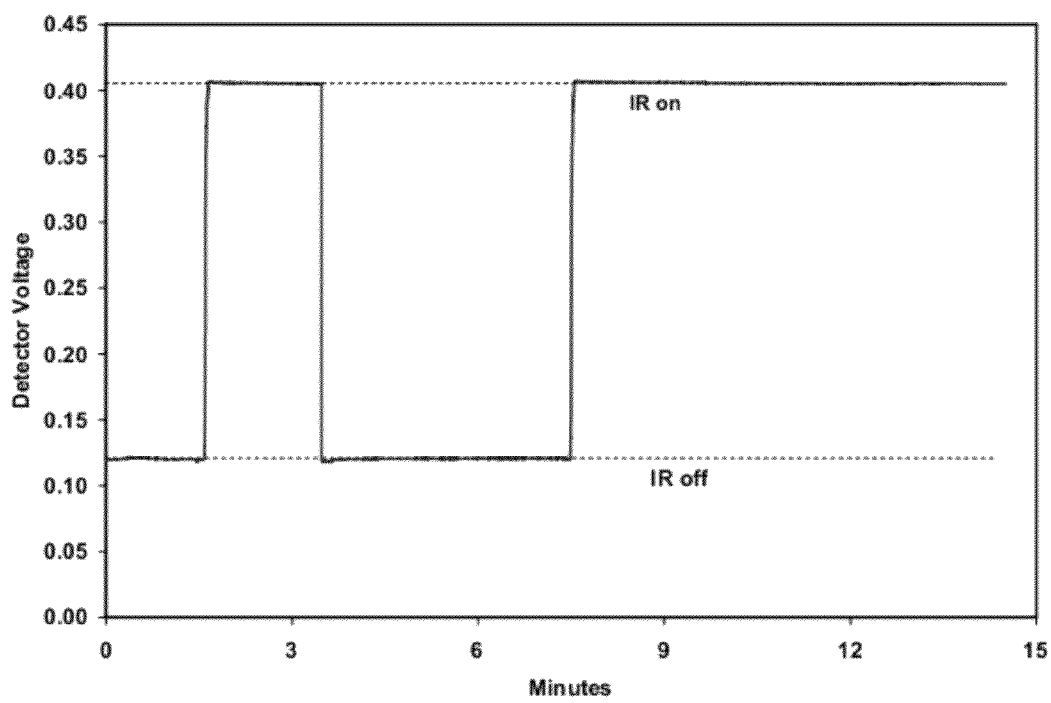
FIG. 15 shows measured data of detector voltage corresponding to IR laser coupling to the film for two cycles with different periods in accordance with the invention.
Figure 15:
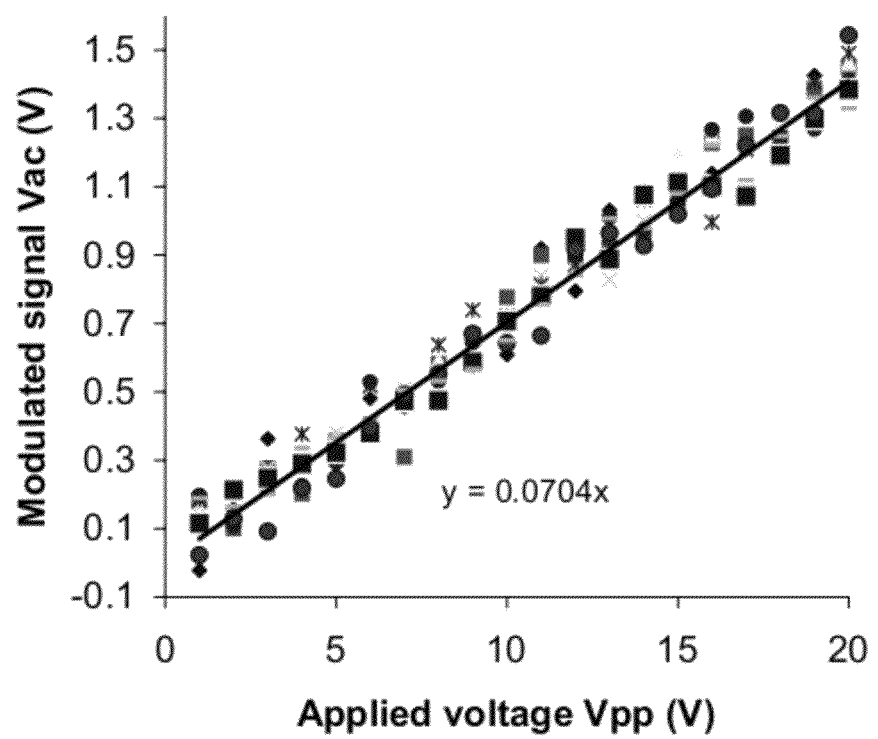

Referring now to FIG. 15, there is shown two cycles of measured voltages corresponding to laser on and off over two different periods. This reproducible data over different duration confirms a steady coupling of laser through the film.

Referring now to FIG. 7, an electro-optic measurement setup 700 is illustrated. A THz waveguide structure 705 has a stack comprising an upper electrode layer 711, an upper cladding layer 712, a cured dendrimer film core 715, a lower cladding layer 716, a lower electrode 717, and a substrate 719. A prism coupler 720 is positioned on a section of cured dendrimer film core 715. THz waveguide structure 705 is positioned on a heater 725. Heater 725 is coupled to a relay 730 and temperature controller 735, which in turn is controlled by a computer 740. Computer 740 is also coupled to a function generator 750, a power and wavelength meter 760 and a digital multimeter 765. Function generator 750 is coupled to upper and lower electrodes 711 and 717, respectively. Power and wavelength meter 760 is coupled to a detector 770. A laser 775 provides an incident laser beam 780 via a mirror 778. Beam 780 propagates through a polarizer 720 that selects either a TE or TM mode of the incident beam 780.

The incident beam 780 while traveling through the waveguide 705 is modulated with a low frequency AC excitation applied via the function generator 750. The modulated signal is detected by the detector 770 and read by a lock-in amplifier at the reference frequency applied by the function generator 750. A signature of the material response is shown in FIG. 15a. Here the modulated signal read by the lock-in amplifier is plotted as a function of modulating voltage. A linear behavior observed from repeated measurements indicate that the material is responding to the modulation signal, as expected.

III. Exemplary Power Measurements

Dendrimer has a lower dielectric constant ($\in$-2.5) that favors phase matching of the pump and generated THz radiation. Dendrimer also has a higher EO coefficient; chromophore doped dendrimer film exhibits $r_{33}$ value ~130 pm/V, but may reach to 300 pm/V or higher by optimizing the doping and poling protocol. Dendrimer offers a superior combination of the factors $\in$ and $r_{33}$ that are also important for optimizing pump-THz conversion via EOR.

Dendrimer is poled for optimum electro-optic properties. Poling of dendrimer films and electro-optic measurement of poly-(amidoamine organosilicon) (PAMAMOS) dendrimer has been discussed above and repeated here in summary form. A chromophore doped PAMAMOS (generation 3) dendrimer film was prepared on a glass slide coated with aluminum and subsequently corona poled using a setup as described above. Essentially, a needle electrode was placed 1 cm above the film to apply a high voltage across the thickness of the film while the poling current was monitored as a function of applied voltage at an elevated temperature near the glass transition point. The dendrimer was doped with alizarin (Alfa Aeser) chromophore. The average film thickness was 100 μm and corresponding poling field strength was 6.6.×10$^5$ V/cm. Refractive index (RI) of both poled and unpoled films was measured with a prism coupler (Metricon 2010) as a function of wavelength at room temperature. The measurements were done in the TE mode so that the propagation of probing wavelength was perpendicular to the dipole alignment. A systematic difference in refractive index, n(λ), resulted due to poling. The index difference, |Δn| is utilized to compute $r_{33}$ (λ) from the Pockels effect, $|\Delta n|=\frac{1}{2} n^3 r_{33} E_p$, where $E_p$ is the poling field strength; a value of $r_{33}$ ~130 pm/V was obtained at 633 nm falling to ~90 pm/V at 1553 nm. The RI of the poled films was measured after 72 days of poling, thus, time dependent decay of $r_{33}$, if any, was not captured, but often $r_{33}$ value of many side-chain polymeric materials may decay following poling over a longer period. Nevertheless, this value of $r_{33}$ is significantly higher than many inorganic materials used in THz generation such as LiNbO$_3$ ($r_{33}$ ~32 pm/V) and GaP ($r_{33}$ ~1.1 pm/V). This is also higher than many reported NLO organic materials such as DR1-MMA ($r_{33}$ ~25-30 pm/V, see Sinyukov et al., 2002). The NLO dendrimer is, therefore, a suitable nanomaterial for THz generation via EOR.

It has been shown that THz generation via EOR is a second order phenomenon and the governing equation can be derived from the Maxwell's Equation. The second order polarization is a product of the second order susceptibility, $\chi^{(2)}$ and the square of the field strength, $\tilde{E}$:

$$\tilde{P}^{(2)}(t)=\chi^{(2)}\tilde{E}^2(t), \quad (3)$$

where, $\chi^{(2)}$ is proportional to the product of the dielectric constant squared and the electro-optic coefficient;

$$\chi^{(2)} \propto -\in^2 \ldots T_{33}. \quad (4)$$

For zinc-blende crystals such as ZnTe, it is known to use a nonlinear susceptibility tensor to derive an approximate magnitude of the THz as given by:

$$E_{THZ} \max \propto d_{14} E^2 \text{pump}. \quad (5)$$

where, $d_{14} = \frac{1}{2}\chi^{(2)}$ and $E_{pump}$ is the pump energy. Using this value and Eq. (4), the magnitude of THz field can be approximated in terms of $r_{33}$:

$$E_{THZ} \max \propto r_{33} E^2 \text{pump}. \quad (6)$$

The THz power from EOR is, therefore, expected to be proportional to the square of peak pump energy. It has been previously shown that for GaP a faster than quadratic scaling of THz power has been obtained. For dendrimer, no reported formulation is available, and to our knowledge, the present work is the first of similar efforts. It is, however, evident from Eq. (6) that while the output power should depend quadratically on the pump power, it also depends linearly on $r_{33}$. Thus, a higher $r_{33}$ value will translate in to a higher output power leading to a higher efficiency.

The most influencing factors in pump-THz conversion, in addition to the input pump power, are (i) dipole moment population and their orientation giving rise to the second order susceptibility or, equivalently, the electro-optic coefficient, $r_{33}$ (via Eq. 6), and (ii) the effective pump intensity. From a functional point of view, the output power can be generalized as:

$$w_{THZ} = f(w_p, r_{33}, I_{eff}, A) \quad (7)$$

where, $w_p$ is the input pump power to a femto laser, $I_{eff}$ is the effective pump intensity, and A is the number of waveguides in an array that can be pumped by a single laser. Note that we consider $w_p$ as the pump power to the femto second laser (usually a green laser) to arrive at realistic wallplug efficiency. In what follows, the influence of $r_{33}$ and $I_{eff}$ are examined in terms of an approximate model.

In light of Eq. (6), and previously reported data, it is assumes a model with a quadratic function:

$$w_{THZ \max} = a_{dend} w^2 p, \quad (8)$$

where, $a_{dend}$ is an appropriate coefficient for dendrimer that depends on $r_{33}$ and also on other factors indicated in Eq. (7). We first consider the effect of $r_{33}$. Assuming $r_{33}$=130 pm/V for dendrimer, and by comparison with a quadratic fit to previously reported date for GaP, $a_{dend}$ is estimated to be 6.37. Eq. (8) has been plotted in FIG. 16 (open circles) along with the previously reported data (closed squares) that shows that ~100 μW THz power can be generated corresponding to a pump power of <4 W. However, 1 mW THz power can be obtained from a pump power of ~12.3 W. There is a distinct increase for the dendrimer case compared to GaP. While a further higher pump power can raise the output power, however, because of the linear nature, the electro-optic coefficient alone will boost pump-THz conversion only up to a certain level. Additional mechanism such as a combined effect of intensity enhancement is necessary for further increase of power.

In THz emitters, commonly a pump laser is focused on ~2 mm spot of the emitter. If the energy of this laser is confined within the core of a waveguide, the pump intensity will increase by ~7 orders of magnitude inside the waveguide by virtue of its smaller dimensions, e.g., a core of 5 μm.

It has been previously reported that for GaAs crystals, the emitted THz power has a radial dependence on the rectified area, i.e., the laser spot size. The output power was found to be the maximum at an incident spot radius of ~100 μm for an unguided emitter. Thus, it is implied that generated power should be a function of intensity. Starting from nonlinear Maxwell's equation, the derived THz electric field for ZnTe has been obtained. Dendrimer film has a low dielectric loss because of its low dielectric constant that favors the momentum matching, and ideally one may assume $\Delta k^{THZ}$–1. Further, for a fixed length of rectification, the ZnTe equation reduces to, $$E^{THZ}(\omega) \propto \chi_{(2)} \tilde{I}(\omega) \quad (9)$$

Thus, the pump-THz conversion also depends on the applied pump intensity. Although the measured quantity due to enhanced intensity is still power, however, it is important to note that, produced power is dependent on the effective intensity (W/cm$^2$) of the pump power. It is known that for both GaAs and InAs based THz emitters, the output THz field (V/cm) increases as a function of applied fluence (J/cm$^2$), a quantity related to intensity.

While for a 5 μm waveguide core, ~7 orders of magnitude increase is possible, a practical upper limit needs to be determined. For comparison purposes we now assume $a_{dend}$=f(r$_{33}$, I$_{eff}$) and use the new value of $a_{dend}$ in Eq. (8). An intensity enhancement of ~100% brings the pump requirement down to ~8.9 Watts to generate 1 mW output, while at 12.3 Watts the output increases by ~1.9 mW.

IV. Exemplary Devices

Referring back to FIG. 2, there is shown five dendrimer films of five different compositions that were produced by identical process. As seen from their variation in shading and also from measured the RI (see FIG. 3), the RI variation has been accomplished via natural index contrast (NIC) method as discussed in the related applications that were incorporated herein by reference above. These films, in combination with others, can be used to form the core and cladding of a THz waveguide.

Figure 17:
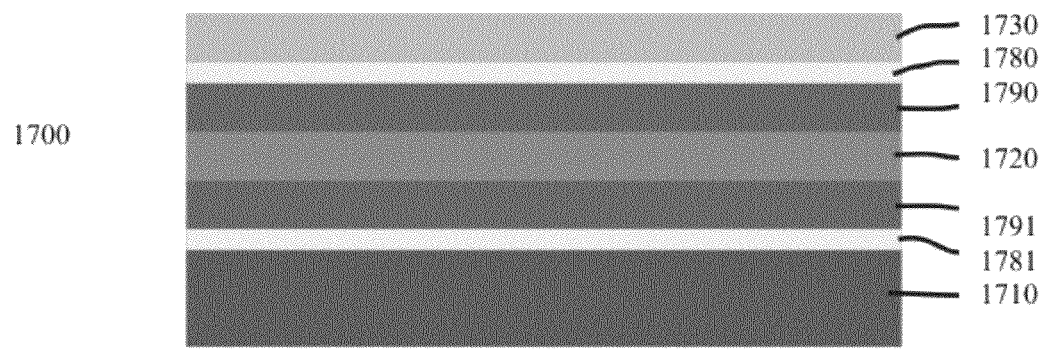
FIG. 17 shows the structure of a THz waveguide element in accordance with the invention.

Referring now to FIG. 17, there is shown an exemplary detailed structure of a THz waveguide 1700. THz waveguide 1700 includes a substrate 1710 upon which the remaining layers are built upon. A top 1780 and a bottom electrode 1781 are placed on either side of a waveguide cladding 1790 and 1791, respectively. The electrodes 1780 and 1781 provide a means by which an external electric field can be applied to the THz waveguide 1700. The cladding layers 1790 and 1791 and a core 1720 are deposited by the procedure described above and in the previously cited applications and patent that were incorporated herein by reference. A spin-on indium tin oxide or other suitable conductive nanomaterials or metals can be deposited by spin coating or by evaporation or by sputtering to form bottom electrode 1781. The top electrode 1780 was also deposited by a similar process as the bottom electrode 1781 and subsequent patterning via common lithography using a mask. A cover layer 1730 covers a top electrode 1780 with an unspecified refractive index.

Figure 18:
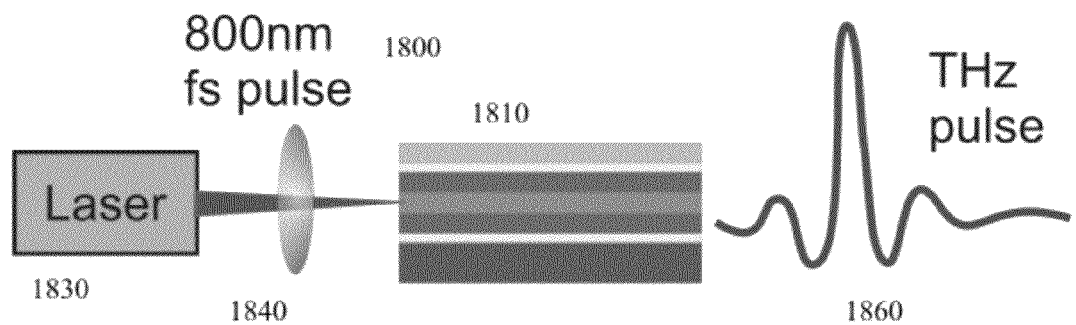
FIG. 18 exhibits the principle of THz generation via electro-optic rectification effect in a waveguide in accordance with the invention.

Referring now to FIG. 18, there is shown an exemplary THz waveguide system 1800 generating a THz pulse 1860 via an electro-optic rectification effect in a THz waveguide 1810. A 800 nm fentosecond pulsed laser 1830 generates a laser pulse that is focused by a lens 1840 and directed at a core 1850 of THz waveguide 1810. As a result of the electro-optic rectification effect as discussed above, a THz pulse 1860 is generated for use in other systems.

Figure 19:
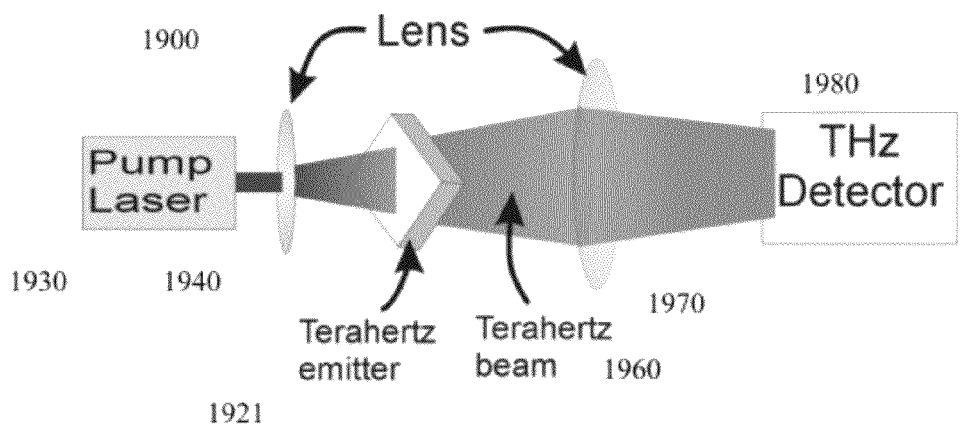
FIG. 19 shows a THz emitter from a bulk dendrimer film in accordance with the invention.

Referring now to FIG. 19, there is shown an exemplary THz generator system 1900 that uses a bulk dendrimer on a substrate as the THz emitter 1910. The bulk dendrimer is processed as discussed above. Here a femto second laser pulse is shined on a high EO dendrimer film 1910. The incident angle of the femto laser 1930 can be vertical (90°) or at angle appropriate for the coupling arrangement such that maximum energy is coupled to the film 1910. When the beam is incident perpendicularly on to the dendrimer film 1910, the incident laser beam will propagate through the assembly holding the film 1910 including substrate. The femto second laser pulse (pump) is rectified by dendrimer 1910 and a pump-terahertz conversion takes place. The converted or 'rectified' beam 1960 is emitted as a terahertz radiation. In the case of a waveguide structure, both the femto second beam and the generated terahertz beam 1960 will travel through the waveguide that can be collected at the output. Usually the femto laser beam is filtered out to collect the terahertz beam 1960. In summary, a pump laser 1930 generates a laser pulse that is focused by a lens 1940 and directed to the bulk dendrimer THz emitter 1910. The resulting THz beam 1960 is fed through a second lens 1970, which focuses and directs the THz beam 1960 towards a detector 1980.

Figure 20:
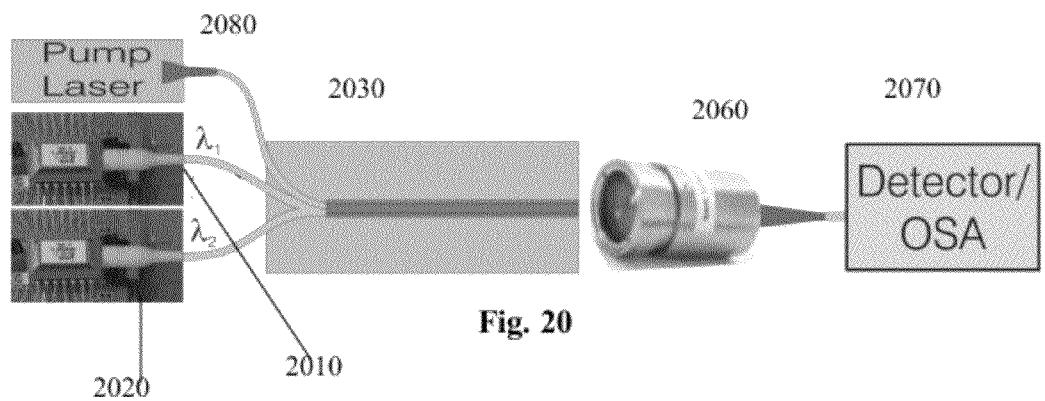
FIG. 20 shows a pump laser and signal laser connected to a THz waveguide element in accordance with the invention.

Referring now to FIG. 20, there is shown another exemplary system 2000. System 2000 has two inputting lasers 2010 and 2020, respectively, of two different wavelengths that are fed into a THz waveguide 2030. Lasers 2010 and 2020 come in a 14 pin butterfly package. However, free-space lasers can also be used. These lasers have a typical output power of .about.1 microwatt to 1 watt; however, their output power can be varied by varying the applied current, thus allowing an additional means of tuning the THz output power. A fiber coupled collimator 2060 is used to collect and direct the generated THz pulse to a detector and a wavelength meter 2070. An optical spectrum analyzer can also be used to see the isolated input wavelengths from lasers 2010 and 2020. A pump laser 2080 is simultaneously being input to the THz waveguide.

Figure 21:
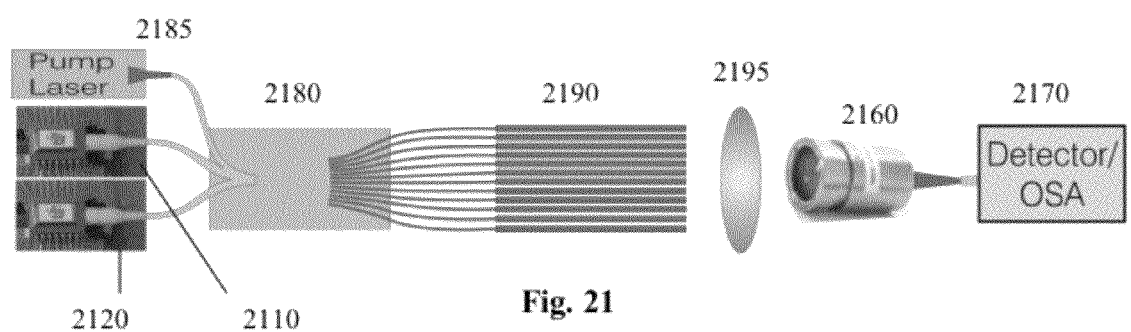
FIG. 21 shows an array of THz waveguide elements connected to a splitter where the splitter is connected to the input lasers in accordance with the invention.
Figure 22:
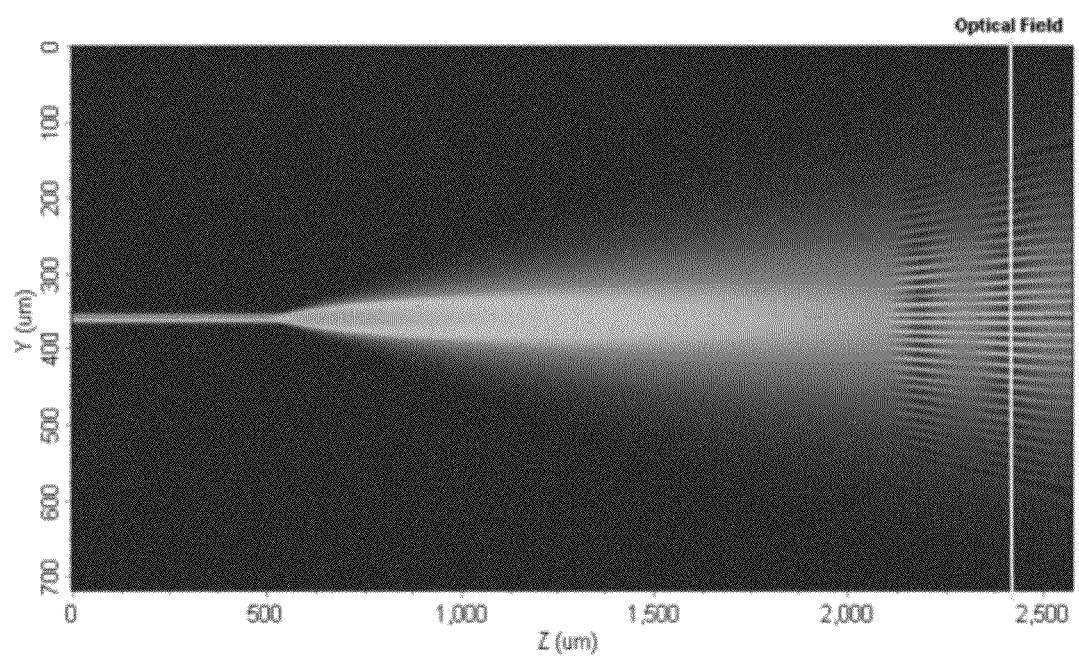
FIG. 22 is a simulated intensity distribution within the splitter in accordance with the invention.
Figure 23:
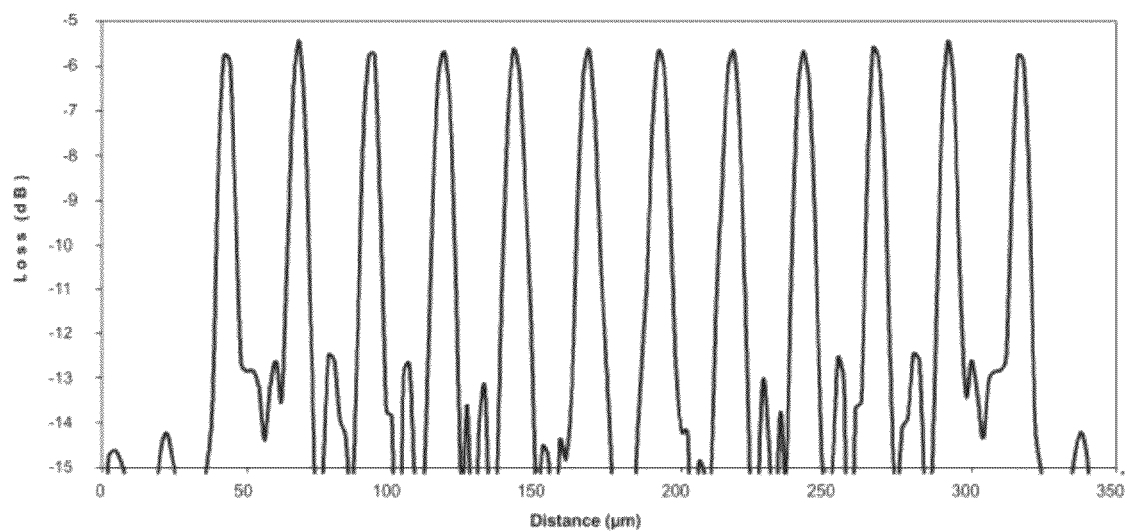
FIG. 23 is a graphical display of intensity distribution of within the splitter channels in accordance with the invention.

Often the output power of the generated THz from a single waveguide is not strong enough; usually in the range of a few milliwatts. Referring now to FIG. 21, there is shown another system 2100 where an array of THz waveguides 2190 is used to amplify the output power of the THz generator 2180. An on-chip splitter 2185 is used to split and distribute power from the input lasers 2110 and 2120 to the THz waveguide array 2190. Alternatively, individual fibers of an input fiber array connected to the THz array can be supplied with individual lasers to obtain an even higher output power. The output from the THz waveguide array 2190 is fed through a lens 2195 to a collimator 2160 and finally to a detector 2170. FIG. 22 illustrates a simulated intensity distribution within the splitter 2185 and FIG. 23 is a graphical display of intensity distribution within the splitter channels.

Thus FIG. 20 and FIG. 21 demonstrate that there are several ways to amplify the output power of a THz waveguide device. First, by using a high efficiency electro-optic dendrimer based THz waveguide. Second, by tuning the power of the input lasers. Third, by using an array of THz waveguides to boost the output THz power.

There is yet another way to enhance output power efficiency. This is by enhancing the effective intensity of pump power within the waveguide as opposed to pumping a bulk sample as done in the current practice.

In addition, different combinations of input laser wavelengths $\lambda_1$ and $\lambda_2$ can be used to tune the output frequency of the THz generator, as depicted in FIG. 20 and FIG. 21. In fact, both $\lambda_1$ and $\lambda_2$ can span a range of 390 nm to 1600 nm. The difference frequency THz spectrum can span over 0.1 THz to 20 THz.

Figure 24:
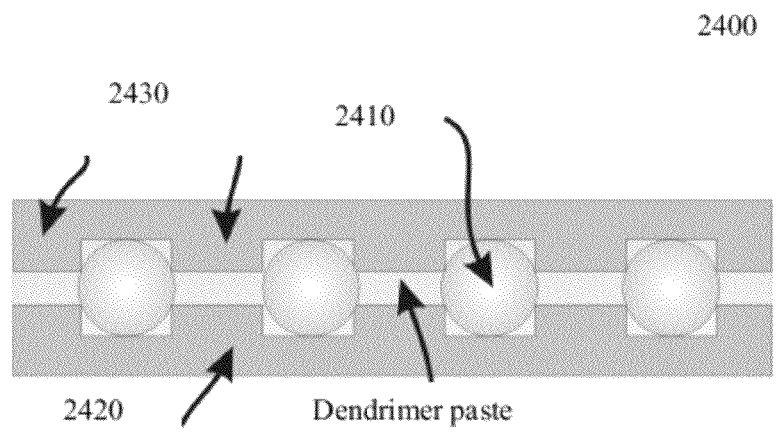
FIG. 24 shows the cross section of a fiber array used to connect the input/output to the device in accordance with the invention.
Figure 25:
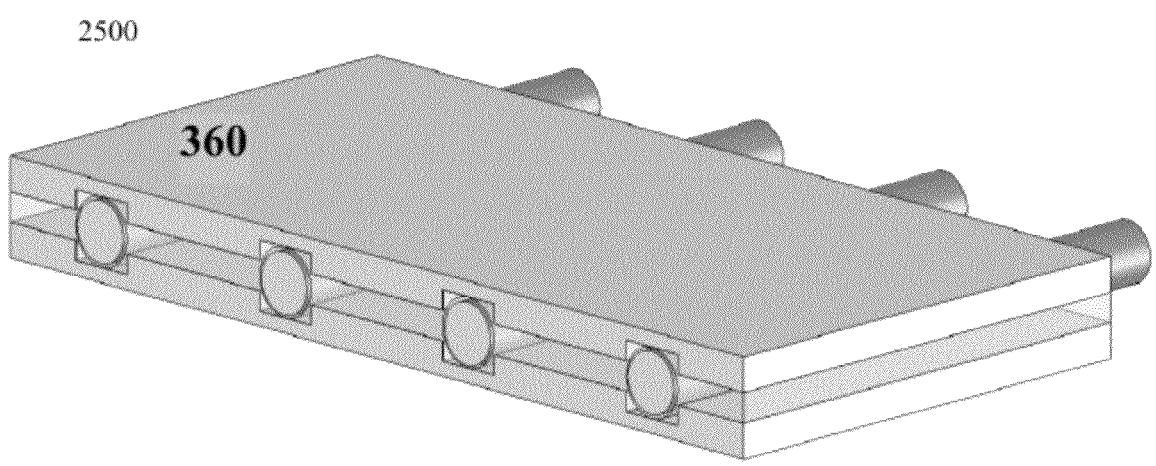
FIG. 25 shows a 3-D rendering of the fiber array of FIG. 24 in accordance with the invention.

As discussed with respect to FIG. 21, individual fibers of an input fiber array connected to the THz array can be supplied with individual lasers to obtain an even higher output power. Referring now to FIG. 24, there is shown a cross section of a fiber array 2400 made from dendrimer film on a wafer. Here only four fibers 2410 are shown but an actual array may have n-number of fibers. A bottom piece 2420 and a top piece 2430 are lithographically patterned on to a dendrimer film to hold the fibers 2410 in place. The cladding diameter of a single mode fiber may be up to 125 microns; therefore, a significant portion of the fiber is sticking out of the bottom groove. The bottom piece 2420 is placed in a ribbonizer and sufficient dendrimer paste is applied to the piece 2420. The fibers are placed on the groove and more dendrimer paste is applied. Simultaneously, dendrimer paste is also applied to the top piece 2430 which is then placed on the lined up fibers. The whole assembly is cured to finish the fiber array. Referring now also to FIG. 25, a finished fiber array 2500 is shown. This fiber array 2500 is subsequently polished, aligned, and attached to the device (i.e., the main chip) by means of the same dendrimer paste. Thus, the present invention overcomes the problem of index mismatch and thermal expansion mismatch in dissimilar materials such as those used silicon V-grooves with different epoxies and adhesives.

The fiber array 2500 thus made and attached to the main chip by means of dendrimer paste becomes an integral part of the device. An important advantage of this technique is that cured dendrimer paste has the same property (i.e., thermal expansion, density, etc.) as the chip. It also matches very closely with the fiber's cladding properties. Therefore, unlike V-groove arrays made from silicon or quartz, dendrimer fiber array enhances the device performance and reliability significantly.

Figure 26:
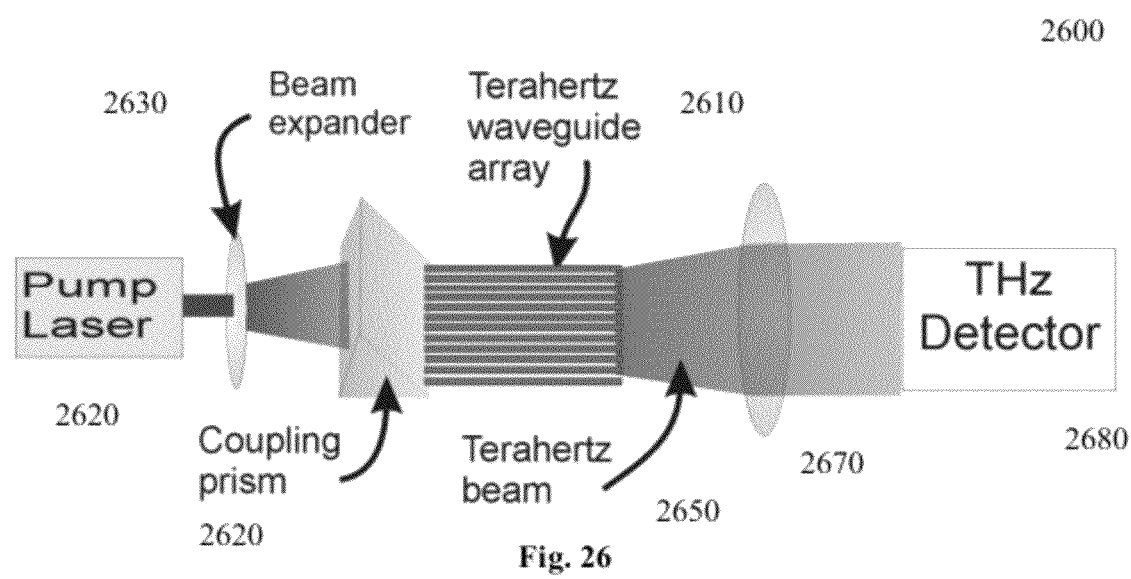
FIG. 26 shows a THz emitter from an array of dendrimer waveguide in accordance with the invention.

Referring now to FIG. 26, there is shown a system 2600 using a THz waveguide array 2610 in accordance with the invention. A pump laser 2620 directs a laser pulse through a beam expander 2630 and a coupling prism 2640 to a THz waveguide array 2610. The resulting THz beam 2650 is then directed to a detector 2680 through a lens 2670.

As shown above, dendrimer, as a spherical molecular polymer, distinguishes itself by 3 structural characteristics: a core molecule; periodically organized layers of molecules around the core, called the shells; and its molecular size that is dependent on the number of shells or "generation". Its attractive properties are used in the present invention to produce a THz waveguide generator. Cured dendrimer film's $T_g$ is significantly higher than 85° C. (a reasonable expectation is $T_g$>110° C.) and cured dendrimer film is very stable. Polymers with linear chain molecular structure are generally 'softer' than glass; they may decay/deform even by the electron beam of SEM. However, cured dendrimer film is actually 'hard'; no significant changes were observed under a high power electron beam of FESEM. Therefore, resulting in minimal photo-degradation.

Dendrimer has a dielectric constant between ~2 and ~4, that favors phase matching. Dendrimer also has a higher EO coefficient. These two are the key factors for higher power THz generation, and dendrimer offers a superior combination of these two factors than any other known material. Dendrimer also allows an advent to manipulate both of these physical parameters (dielectric constant and electro-optic coefficient) on a precise scale via liquid phase doping.

A dendrimer based technology differs from the current art in that it uses a single material system for multiple photonic functionalities and their integrated fabrication in a system-on-a-chip (SOC) configuration. In doing so, it has all the capabilities required for a high efficiency probing sensor as well as for a self contained SOC solution for THz generation. This technique of building a multi functional chip has also application in optical information processing system. Additionally, the scope can be expanded for on-chip light source and detector integrated on the same chip, leading to an "optical processor". Such ability will take the photonic technology to the level of success enjoyed today by electronic IC technology, but in the THz range that can not be achieved by electronics alone.

Dendrimer based technology also overcomes difficulties associated with other non-linear optical polymers. In addition to higher EO coefficient, dendrimer film also exhibit >95% transmission in the near infrared regime. Dendrimer can be processed at a lower temperature of ~200° C., thus overcoming the high temperature limitation of inorganic materials (~1000° C.). Simultaneously, cured dendrimer film has a higher glass transition temperature for continuous stable operation.

Today, a great many photonic devices are made from discrete technology where a single element performs a single function. A number of such discrete elements must be assembled together to produce a system. As a result, system designers must work with a number of different boxes that raises the cost and lowers the reliability. The dendrimer based technology will convert the discrete elements in to a chip based solution where several boxes will be replaced by a single chip.

The present invention, therefore, can revolutionize the THz technology and facilitate an integrated platform. This will also pave the road to an "optical processor" for high-speed, high-bandwidth, fiberoptic network. The new EO polymers have a potential of achieving several times higher EO efficiency compared to current art such as ZnTe and $LiNbO_3$, and simultaneously they can be fabricated on a chip allowing a highly reliable and efficient packaging suitable for portable applications. Additionally, the monolithic fabrication route allows photonic and electronic components to integrate on the same chip, thereby opening a door for a number of important chip based components having applications in communication and sensing.

The present invention also generates a significant fundamental understanding of a new class of optical and electro-optic functional materials derived from dendrimer.

Low dielectric constant and high EO coefficient are two key factors for higher power THz generation. Additionally, an array of THz waveguide can be configured to image a wider area via a CCD system. This option will allow a real-time determination of hidden weapons or explosives on humans. Dendrimer based THz technology can produce a turn-key system suitable for real-time wide area imaging. This will also be suitable for other security and screening applications.

Other embodiments of the invention will be apparent to those skilled in the art from a consideration of this specification or practice of the invention disclosed herein; the scope and spirit of the invention being indicated by the following claims.

What is claimed is:

1. A terahertz emitter, comprising: a bulk dendrimer, wherein the bulk dendrimer is a functionalized dendrimer for generating terahertz radiation with a high pump-terahertz conversion efficiency and high output power; and a substrate, the bulk dendrimer positioned on the substrate.

2. The terahertz emitter of claim 1, wherein the conversion efficiency is greater than 1%.

3. The terahertz emitter of claim 1, wherein the functionalized dendrimer has an enhanced electro-optic coefficient and a second order magnetic susceptibility resulting from poling induced dipole orientation.

4. The terahertz generator of claim 1, wherein the dendrimer contains an enhanced number of dipole moments generated from poling at a high electric field at an elevated temperature.

5. The terahertz generator of claim 1, wherein the dendrimer is poled in-situ or ex-situ at a high electric field at an elevated temperature therein incorporating a dipole depleted charge density.

6. The terahertz generator of claim 1, wherein the dendrimer is formed from Generation 0 to Generation 11 dendrimers.

7. The terahertz generator of claim 1, wherein the dendrimer is formed from a film that is cured at a temperature between 80° C. and 400° C.

8. The terahertz generator of claim 7, wherein the cured film has a glass transition temperature higher than 85° C. and suitable for continuous stable operation and extended life.

9. A terahertz system, comprising: a terahertz emitter including a bulk dendrimer, wherein the bulk dendrimer is a functionalized dendrimer for generating terahertz radiation with a high pump-terahertz conversion efficiency and high output power; at least one laser configured to pump a beam through the terahertz emitter; and the terahertz emitter configured to rectify the beam and generate terahertz radiation.

10. The terahertz system of claim 9, wherein the at least one laser is a single pulse laser pump configured to rectify the beam and generate pulsed output terahertz radiation.

11. The terahertz system of claim 9, wherein the at least one laser is a pair of continuous wave lasers configured for difference frequency generation of a continuous wave terahertz radiation.

12. The terahertz system of claim 9, wherein the conversion efficiency is greater than 1%.

13. The terahertz system of claim 9, wherein the functionalized dendrimer has an enhanced electro-optic coefficient and second-order magnetic susceptibility resulting from poling induced dipole orientation.

14. The terahertz system of claim 9, wherein the dendrimer contains an enhanced number of dipole moments generated from poling at a high electric field at an elevated temperature.

15. The terahertz system of claim 9, wherein the dendrimer is poled in-situ or ex-situ at a high electric field at an elevated temperature therein incorporating a dipole depleted charge density.

16. The terahertz system of claim 9, wherein the dendrimer is formed from Generation 0 to Generation 11 dendrimers.

17. The terahertz system of claim 9, wherein the dendrimer is formed from a film that is cured at a temperature between 80° C. and 400° C.

18. The terahertz system of claim 15, wherein the cured film has a glass transition temperature higher than 85° C. and suitable for continuous stable operation and extended life.

* * * * *